(12) United States Patent
Raduchel

(10) Patent No.: US 10,685,516 B1
(45) Date of Patent: Jun. 16, 2020

(54) VIRTUAL INTERCOM SYSTEM

(71) Applicant: eIngot LLC, Great Falls, VA (US)

(72) Inventor: William J. Raduchel, Palo Alto, CA (US)

(73) Assignee: eIngot LLC, Great Falls, VA (US)

( * ) Notice: Subject to any disclaimer, the term of this patent is extended or adjusted under 35 U.S.C. 154(b) by 0 days.

(21) Appl. No.: 16/668,952

(22) Filed: Oct. 30, 2019

Related U.S. Application Data

(63) Continuation-in-part of application No. 16/362,463, filed on Mar. 22, 2019.

(51) Int. Cl.
| | |
|---|---|
| G07C 9/00 | (2020.01) |
| H04L 29/08 | (2006.01) |
| H04M 3/537 | (2006.01) |
| H04L 12/18 | (2006.01) |
| G07C 9/20 | (2020.01) |

(52) U.S. Cl.
CPC ......... G07C 9/00309 (2013.01); G07C 9/215 (2020.01); H04L 12/1813 (2013.01); H04L 67/025 (2013.01); H04L 67/325 (2013.01); H04M 3/537 (2013.01); *G07C 2009/00388* (2013.01); *G07C 2009/00769* (2013.01)

(58) Field of Classification Search
None
See application file for complete search history.

(56) References Cited

U.S. PATENT DOCUMENTS

| | | | |
|---|---|---|---|
| 8,375,118 B2 | 2/2013 | Hao et al. | |
| 8,872,915 B1 | 10/2014 | Scalisi et al. | |
| 9,741,186 B1 * | 8/2017 | Lemke | G07C 9/00817 |
| 9,984,520 B1 | 5/2018 | Heller et al. | |
| 10,185,921 B1 | 1/2019 | Heller et al. | |
| 10,257,708 B1 | 4/2019 | Kamkar et al. | |

(Continued)

OTHER PUBLICATIONS

Amazon.com [online], "GBF WiFi Doorbell Intercom for Multi-Unit Apartment Building (3 Units), Remote Access by Android and iOS Device," available on or before Mar. 21, 2019, [retrieved on Feb. 27, 2019], retrieved from URL <https://www.amazon.com/GBF-Intercom-Doorbell-Multi-unit-Apartment/dp/B01GW5K8U8>, 9 pages.

(Continued)

*Primary Examiner* — Curtis J King
(74) *Attorney, Agent, or Firm* — Fish & Richardson P.C.

(57) ABSTRACT

Methods, systems, and apparatus, including computer programs encoded on a computer storage medium, for a virtual intercom. In some implementations, a request from a visitor device to communicate with an occupant of a particular unit of the facility is received. A location of the visitor device is received. Based on the received location, it is determined that the visitor device is within a predetermined bounded area. An occupant profile is identified based on the received request. Information associated with the occupant profile is obtained. Based on the obtained information, it is determined the occupant has registered a profile. Based on the obtained information, a communication path to an occupant device is identified. The request from the visitor device is sent, using the communication path, to an occupant device belonging to the occupant. A response from the occupant device is received. Based on the response, an action is performed.

20 Claims, 31 Drawing Sheets

(56) References Cited

U.S. PATENT DOCUMENTS

| | | | |
|---|---|---|---|
| 10,515,498 B2 | 12/2019 | Chang et al. | |
| 2004/0219903 A1* | 11/2004 | Despain | G07C 9/00023 |
| | | | 455/410 |
| 2004/0243812 A1 | 12/2004 | Yui | |
| 2010/0141381 A1* | 6/2010 | Bliding | G07C 9/00309 |
| | | | 340/5.61 |
| 2010/0195810 A1 | 8/2010 | Mota et al. | |
| 2010/0306549 A1* | 12/2010 | Ullmann | G07C 9/00103 |
| | | | 713/185 |
| 2012/0234058 A1* | 9/2012 | Neil | G07C 9/00571 |
| | | | 70/91 |
| 2012/0299700 A1* | 11/2012 | Davis | G07C 9/00571 |
| | | | 340/5.54 |
| 2013/0017812 A1* | 1/2013 | Foster | H04L 12/2825 |
| | | | 455/417 |
| 2013/0057695 A1 | 3/2013 | Huisking | |
| 2014/0049361 A1 | 2/2014 | Ahearn | |
| 2014/0236350 A1* | 8/2014 | Woodard | G06Q 50/16 |
| | | | 700/237 |
| 2015/0067792 A1 | 3/2015 | Benoit | |
| 2015/0145647 A1* | 5/2015 | Engel-Dahan | G07C 9/00571 |
| | | | 340/5.61 |
| 2015/0379796 A1 | 12/2015 | Glasgow et al. | |
| 2016/0049030 A1 | 2/2016 | G | |
| 2016/0055698 A1* | 2/2016 | Gudmundsson et al. | |
| | | | G07C 9/00142 |
| | | | 340/5.52 |
| 2016/0116510 A1 | 4/2016 | Kalous et al. | |
| 2016/0180621 A1 | 6/2016 | Desinor, Jr. | |
| 2016/0217637 A1 | 7/2016 | Gengler et al. | |
| 2016/0217638 A1 | 7/2016 | Child | |
| 2016/0232729 A1* | 8/2016 | Engel-Dahan | G07C 9/00571 |
| 2016/0364928 A1* | 12/2016 | Woodard | G07C 9/00166 |
| 2017/0002586 A1 | 1/2017 | Lee | |
| 2017/0084101 A1 | 3/2017 | Yun | |
| 2017/0287248 A1 | 10/2017 | Aase | |
| 2017/0294064 A1* | 10/2017 | Desinor, Jr. | G07C 9/00896 |
| 2017/0365119 A1 | 12/2017 | Yun | |
| 2017/0372546 A1 | 12/2017 | Haruna | |
| 2018/0005143 A1 | 1/2018 | Camargo | |
| 2018/0053363 A1* | 2/2018 | Ravida | H04N 7/186 |
| 2018/0061160 A1* | 3/2018 | Woodard | G07C 9/00571 |
| 2018/0151007 A1 | 5/2018 | Einberg | |
| 2018/0158267 A1 | 6/2018 | Kontturi | |
| 2018/0190049 A1* | 7/2018 | Schmidt-Lackner | |
| | | | G07C 9/00007 |
| 2018/0322718 A1 | 11/2018 | Qian et al. | |
| 2019/0043326 A1* | 2/2019 | Madden | G08B 13/1966 |
| 2019/0088048 A1* | 3/2019 | Minsley | G07C 9/00571 |
| 2019/0122293 A1* | 4/2019 | Minsely | H04L 9/0894 |
| 2019/0238355 A1 | 8/2019 | Marcinkowski et al. | |

OTHER PUBLICATIONS

Amazon.com [online], AMOCAM Video Door Phone System, 4.3 Inch Clear LCD Monitor Wired Video Intercom Doorbell Kits, Night Vision Camera Door Bell Intercom, Doorphone Telephone style for Home Improvement, available on or before Mar. 21, 2019, [retrieved on Feb. 27, 2019] retrieved from URL <https://www.amazon.com/AMOCAM-Intercom-Doorphone-Telephone-Improvement/dp/B01CW0LWSY/?ref=asc_df_B01CW0LWSY/?tag=hyprod-20&linkCode=df0&hvadid=198057875972&hvpos=1o2&hvnetw=g&hvrand=16136109502412241130&hvpone=&hvptwo=&hvqmt=&hvdev=c&hvdvcmd1=&hvlocint=&hvlocphy=1014895&hvtargid=pla-347917186462&psc=1>, 10, pages.

unikcctv.com [online], Nik: Security&Pos, Inc., 2013, [retrieved on Feb. 27, 2019] retrieved from URL <https://www.unikcctv.com/index.php>, 9 pages.

Youtube.com [online], "IP Video Intercom System for Apartment Complexes," dated Aug. 2, 2017, [retrieved on Feb. 27, 2019], retrieved from URL <https://www.youtube.com/watch?v=M1kuBZwbOkQ>, 3 pages.

* cited by examiner

2100

```
┌─────────────────────────────────────────────────────────┐
│ RECEIVE, FROM A FIRST CLIENT DEVICE, AN IDENTIFIER FOR  │
│  A PORTION OF A PROPERTY AND DATA IDENTIFYING A         │
│      LOCATION OF THE FIRST CLIENT DEVICE                │
│                                                    2110 │
└─────────────────────────────────────────────────────────┘
                            │
                            ▼
┌─────────────────────────────────────────────────────────┐
│ DETERMINE A SECOND CLIENT DEVICE THAT CORRESPONDS       │
│  TO THE IDENTIFIER FOR THE PORTION OF THE PROPERTY      │
│                                                    2120 │
└─────────────────────────────────────────────────────────┘
                            │
                            ▼
┌─────────────────────────────────────────────────────────┐
│ BASED ON THE LOCATION OF THE FIRST CLIENT DEVICE,       │
│ DETERMINE THAT THE FIRST CLIENT DEVICE IS LOCATED       │
│    WITHIN A THRESHOLD DISTANCE OF THE PROPERTY          │
│                                                    2130 │
└─────────────────────────────────────────────────────────┘
                            │
                            ▼
┌─────────────────────────────────────────────────────────┐
│ BASED ON DETERMINING THAT THE FIRST CLIENT DEVICE IS    │
│   LOCATED WITHIN THE THRESHOLD DISTANCE OF THE          │
│ PROPERTY AND BASED ON DETERMINING THAT THE SECOND       │
│ CLIENT DEVICE CORRESPONDS TO THE IDENTIFIER FOR THE     │
│ PORTION OF THE PROPERTY, TRANSMIT, TO THE SECOND        │
│ CLIENT DEVICE, DATA INDICATING THAT THE FIRST CLIENT    │
│         DEVICE IS LOCATED AT THE PROPERTY               │
│                                                    2140 │
└─────────────────────────────────────────────────────────┘
                            │
                            ▼
┌─────────────────────────────────────────────────────────┐
│ RECEIVE, FROM THE SECOND CLIENT DEVICE, AN              │
│ INSTRUCTION TO GRANT A PERSON ASSOCIATED WITH THE       │
│  FIRST CLIENT DEVICE ACCESS TO THE PROPERTY             │
│                                                    2150 │
└─────────────────────────────────────────────────────────┘
                            │
                            ▼
┌─────────────────────────────────────────────────────────┐
│ TRANSMIT AN INSTRUCTION TO UNLOCK AN ELECTRONIC         │
│         LOCK OF A DOOR OF THE PROPERTY                  │
│                                                    2160 │
└─────────────────────────────────────────────────────────┘
```

FIG. 21

VIRTUAL INTERCOM SYSTEM

CROSS-REFERENCE TO RELATED APPLICATION

This application is a continuation-in-part of U.S. application Ser. No. 16/362,463, filed Mar. 22, 2019, which is incorporated by reference.

FIELD

This description relates to a virtual intercom system and associated methods.

BACKGROUND

Traditional intercom systems depend upon either a physically installed intercom or a public switched telephone network (PSTN) telephone. These traditional systems are expensive, require difficult installation, and are difficult to upgrade. As such, there is a need for a cheaper, more versatile intercom system. Increasingly, occupants no longer have a PSTN phone.

SUMMARY

In some implementations, a system is directed towards a virtual intercom system for a facility. The virtual intercom system uses a mobile app, computer program, or website to facilitate communication between an occupant of the facility and a visitor. The virtual intercom system maintains the privacy and safety of the occupant while allowing a visitor to communicate securely with the occupant. The virtual intercom system may require that the visitor be within a certain area near the facility or a specific entrance of the facility before it established communication between the visitor and the occupant. Through the virtual intercom system, an occupant may provide the visitor an access code to gain entry to the facility through a third-party application or system.

In one aspect, a method includes: receiving, at a computer system, a request from a visitor device to communicate with an occupant of the facility; receiving, at the computer system, a location of the visitor device; based on the received location, determining that the visitor device is within a predetermined bounded area; based on the received request, identifying an occupant profile; obtaining information associated with the occupant profile; based on the obtained information, determining that the occupant has registered a profile; based on the obtained information, identifying a communication path to an occupant device; sending, from the computer system and using the communication path, the request from the visitor device to the occupant device; receiving, at the computer system, a response from the occupant device; and based on the response, performing an action.

In some implementations, the method further includes: receiving, at the computer system and from a manager device, input describing a bounded area; and wherein the predetermined bounded area is the described bounded area.

In some implementations, the predetermined bounded area encompasses the facility.

In some implementations, the predetermined bounded area encompasses only an entrance of the facility.

In some implementations, the predetermined bounded area encompasses an entrance of the facility and an entrance buffer area within a threshold distance surrounding the entrance of the facility.

In some implementations, the received response indicates that the occupant accepts the request to communicate; and wherein performing an action comprises permitting communication between the visitor device and the occupant device in accordance with the identified communication path.

In some implementations, the received response is a verbal response.

In some implementations, the received response is a touch-tone response associated with a number on a keypad.

In some implementations, the received response includes at least one of start communication, deny communication, start messaging, deny messaging, start voice call, deny voice call, accept video call, deny video call, permit facility access, or deny facility access.

In some implementations, the communication path includes at least one of a voice call, a video call, a message, or a notification.

In some implementations, identifying a communication path includes determining, based on the obtained information, that the occupant has selected a preferred communication path. Where the identified communication path is the preferred communication path selected by the occupant.

In some implementations, identifying a communication path includes determining, based on the obtained information, that the occupant has not selected a preferred communication path. Where the identified communication path is a default communication path.

In some implementations, the method further includes: obtaining a time at which the request was received; based on the obtained information, determining a time period in which the occupant accepts requests; comparing the obtained time with the time period; and based on the comparison, determining that the obtained time falls within the time period.

In some implementations, the received request includes a request for access to an entrance of the facility; the received response indicates that access should be granted; and performing an action includes sending a command to a physical access control system to unlock an entrance of the facility.

In some implementations, the received request includes a request for access to an entrance of the facility; the received response indicates that access should be granted; and performing an action includes sending an access code to the visitor which can be used to gain entry to the facility.

In some implementations, the access code is a one-time access code.

In another aspect, a system includes: a visitor device having a global positioning unit and configured to send a request; an occupant device configured to receive a request; a manager device configured to determine one or more geographic areas; and a computer system configured to: communicate with the visitor device; communicate with the occupant device; communicate with the manager device; receive the one or more geographic areas from the manager device; receive the request from the visitor device; receive a location of the visitor device from the global positioning unit of the visitor device; based on the received one or more geographic areas and the received location, determine that the visitor device is located within the one or more geographic areas; determine that the request should be sent to the occupant; send the request to the occupant device; receive a response from the occupant device; and based on the received response, enable communication between the visitor device and the occupant device.

In some implementations, the system further includes a network configured to facilitate communication between the visitor device and the computer system, the occupant device and the computer system, and the manager device and the computer system.

In some implementations, the system further includes a physical access control system configured to: communicate with the computer system; receive an indication from the computer system to unlock an entrance of the facility; and unlock an entrance of the facility in accordance with the received indication.

In another aspect, one or more non-transitory computer-readable media, storing a computer program, the program comprising instructions that when executed by one or more processing devices cause the one or more processing devices to perform operations including: receiving, by the one or more processing devices, a request from a visitor device to communicate with an occupant of a facility; receiving, by the one or more processing devices, a location of the visitor device; based on the received location, determining that the visitor device is within a predetermined bounded area; based on the received request, identifying an occupant profile; obtaining information associated with the occupant profile; based on the obtained information, determining that the occupant has registered a profile; based on the obtained information, identifying a communication path to an occupant device; sending, by the one or more processing devices and using the communication path, the request from the visitor device to an occupant device belonging to the occupant; receiving, by the one or more processing devices, a response from the occupant device; and based on the response, performing, by the one or more processing devices, an action.

Implementations of the techniques in the application can provide various advantages and improvements over previous systems. For example, by not requiring a physical installation in a facility, the disclosed virtual intercom system is cheaper and more versatile than other intercom systems. In addition, the virtual intercom system provides increased privacy and security for the occupant by limiting a visitor's access to identifying information.

The details of one or more embodiments are set forth in the accompanying drawings and the description, below. Other potential features and advantages of the disclosure will be apparent from the description and drawings, and from the claims.

BRIEF DESCRIPTION OF THE DRAWINGS

FIG. 21 is a flowchart of an example process for granting a visitor access to a building.

Like reference numbers and designations in the various drawings indicate like elements.

DETAILED DESCRIPTION

Figure 1:
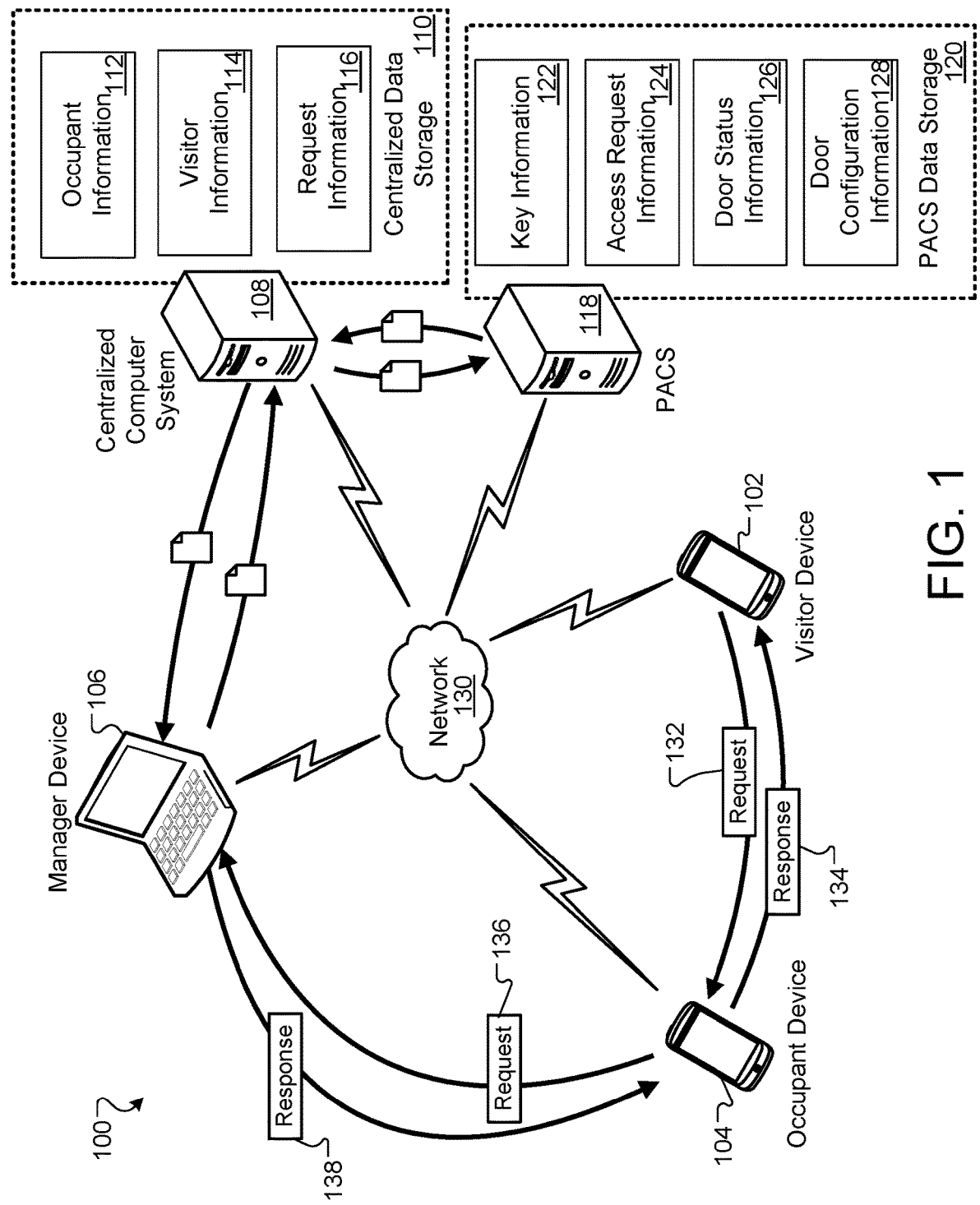
FIG. 1 is an example diagram of a virtual intercom system for facilitating communication between an occupant of a facility and a visitor.

The disclosed system and related techniques are directed towards a virtual intercom system for a facility. The virtual intercom system uses a mobile app, computer program, or website to facilitate communication between an occupant of the facility and a visitor. The virtual intercom system maintains the privacy and safety of the occupant while allowing a visitor to communicate securely with the occupant.

A facility may include, for example, a multi-unit dwelling, an apartment, a house, a townhouse, a condominium, a duplex, other residential facilities, an office, a gated area, other commercial facilities, etc.

A visitor may be a delivery person, a potential client, a client, a potential employee, an employee, a potential work associate, a work associate, a social guest, etc.

The disclosed system and related techniques provide a solution to the problem of allowing a visitor to communicate securely with an occupant of a facility while maintaining the privacy of the occupant. Other intercom systems may reveal the name of an occupant, a unit number of an occupant, a floor of an occupant, and/or a phone number of an occupant when a visitor is attempting to communicate with the occupant, therefore putting the occupant's privacy at risk. In contrast, the disclosed system and related techniques limit the information associated with an occupant that is made available to a visitor.

Specifically, the disclosed system and related techniques may allow a visitor to lookup a unit number or a floor of the occupant without revealing the name of the occupant and/or a phone number of the occupant. Similarly, the disclosed system and related techniques may allow a visitor to enter a name of an occupant without revealing the unit number, floor, and/or phone number of the occupant. The disclosed system and related techniques accomplishes this, in part, through use of a mobile app, a computer program, or a website by which the system facilitates communication between the visitor and the occupant.

The disclosed system and related techniques further protects the privacy and safety interests of an occupant by optionally requiring that the visitor be within a predetermined boundary before they are permitted to contact the occupant. For example, the disclosed system may require that the visitor be within 5 meters of the facility before they can contact an occupant of the facility through the mobile app, computer program, or website. The boundary may be set by a manager of the facility through a manager device 106. When a visitor makes attempts to contact an occupant, a global positioning system (GPS) unit of the visitor device 102 will send a location of the device to the disclosed system. This location may be stored in the disclosed system and made accessible to a manager. The disclosed system determines, based on the received location, whether the visitor device 102 is within the predetermined boundary. If a visitor is too far away (i.e., outside of the predetermined boundary), they may be notified that they are not within the predetermined boundary when attempting to contact an occupant and prevented from contacting the occupant. Similarly, in some implementations, the disclosed system and related techniques further protects the privacy and safety interests of the occupant by requiring that they themselves are within a predetermined boundary before a visitor is able to contact them.

The disclosed system and related techniques further protects the privacy and safety interests of an occupant by allowing the occupant (and/or manager) to choose the method by which they (the occupant) communicate with a visitor. For example, an occupant may choose to permit a visitor to contact them through a notification or a text message, but may prevent contact through a voice call or through a video call. Where contact is made through a voice call or a video call, the visitor will not be provided a phone number of the occupant. However, in some implementations, where contact is made through a voice call or a video call, the occupant may receive the phone number of the visitor or other identifying information of the visitor such as their name. In some implementations, a manager might set a default communication method (e.g., notification(s), text message(s), voice call(s), video call(s), etc.), but the occupant may be permitted to override the default method. In some implementations, a manager may limit the methods by which an occupant may receive a request. In some implementations, where a voice or video call is permitted, the voice of the occupant outputted to the visitor may be modified by a voice changer, but the voice of the visitor outputted to the occupant will be left unmodified. In some implementations, where a video call is permitted, a video of the visitor will be provided to the occupant, but a video of the occupant will not be provided to the visitor.

Similarly, the disclosed system and related techniques further protects the privacy and safety interests of an occupant by allowing the occupant (and/or manager) to choose the method by which they (the occupant) request additional information from a visitor. For example, an occupant may choose to initiate a conversation with the visitor to obtain additional information through a notification, a text message, a voice call, or a video call. Where additional information is sought through a voice call or a video call, the visitor will not be provided a phone number of the occupant. However, in some implementations, where additional information is sought through a voice call or a video call, the occupant may receive the phone number of the visitor or other identifying information of the visitor such as their name. In some implementations, the manager may limit the methods by which an occupant may initiate a conversation with the visitor. In some implementations, where additional information is sought through a voice call or a video call, the voice of the occupant outputted to the visitor may be modified by a voice changer, but the voice of the visitor outputted to the occupant will be left unmodified. In some implementations, where a video call is permitted, a video of the visitor will be provided to an occupant, but a video of the occupant will not be provided to the visitor.

The disclosed system and related techniques also provide a solution to the problem of allowing a visitor to enter a facility or a unit of a facility when an occupant of the facility cannot, or would prefer not to, physically provide access to the visitor. For example, an occupant may not have the ability to physically provide access to the visitor, or would prefer not to, due to them not being on or near the property on which the facility is located, due to potential safety concerns of the occupant, due to a preference of the occupant to protect their privacy/anonymity, or due to an occupant's desire to save time. The disclosed system and related techniques allow a visitor, located at an entrance of a facility or a unit of the facility, to use a mobile app on their device (i.e., visitor device 102), a computer program on their device, or a website which they access through their device to request access to the entrance or the unit. The occupant, to which the request is directed, may respond to the request remotely through the mobile app on their own, separate device (i.e., occupant device 104), the computer program on their device, or the website which they access through their device. The occupant, to which the request is directed, may remotely indicate that access to the visitor should be granted or denied, or they may request additional information from the visitor. If the occupant indicates that the access should be granted, the disclosed system will send a command to a physical access control system (PACS) or provide an access code the visitor can enter to obtain access, the command containing instructions to unlock an entrance of the facility for a period of time.

The disclosed system and related techniques also provide a solution to some of the potential privacy and safety concerns faced by an occupant when providing a visitor access to a facility or a unit of a facility. As previously mentioned, due to potential privacy or safety concerns of an occupant, the occupant may not want to physically provide access to a visitor. These concerns are partially addressed by the remote access through PACS as discussed above. To note, these concerns may be more significant when the occupant has never met the visitor. These concerns may also be more significant when the visitor is a delivery person, a potential employee, or a potential work associate. As such, an occupant may also wish to further protect their privacy and/or safety by keeping any identifying information including their appearance private and/or their unit information private. The disclosed system and related techniques further protects the privacy and safety interests of an occupant by limiting the information that is provided to the visitor. In some implementations, a visitor first looks up a unit number through a mobile app or computer program on their device (i.e., visitor device 102), or through a website accessed by their device. The visitor selects a unit number, and a request for access is sent to an occupant of the unit number. In these implementations, the visitor is not provided the name of the occupant, though the occupant may be provided such information. If the occupant grants the visitor's request, the visitor may receive a notification, for example, that "Occupant of unit #101 has granted your request. You now have access to the front door of the facility for the next 30 seconds." In some implementations, where a visitor knows the name of the occupant that they wish to obtain access from, the visitor first looks up a name of the occupant through a mobile app or computer program of their device (i.e., visitor device 102), or through a website accessed by their device. The visitor selects an occupant's name, and a request for access is sent to the occupant. In these implementations, the visitor is not provided the unit number of the occupant.

The disclosed system and related techniques also eliminate most of the costs associated with a traditional intercom system and reduce the time needed to setup an intercom system. By using a virtual intercom system, there is no need to spend the time and cost installing a physical intercom system in the facility. Such traditional systems are expensive and require difficult installation as numerous wires may need to be run throughout the facility on which the intercom is being installed. The disclosed system and related techniques remove the need for such traditional systems by using a mobile application, computer program, or website and a GPS of a visitor device 102 to determine that the visitor is within an appropriate area, e.g., an area where a traditional intercom system panel would normally be located.

FIG. 1 is a diagram that illustrates an example of a system 100 for facilitating communication between an occupant of a facility and a visitor. As shown, the system 100 includes an occupant device 104, a manager device 106, a visitor device 102, a centralized computer system 108, and a PACS 118 which are all connected to a network. The network may be a wide area network (WAN), such as the internet. The devices may access the network through a cellular connection. The devices may access the network through a Wi-Fi connection. As shown, the centralized computer system 108 containing a database ("centralized data storage 110") which stores occupant information 112, visitor information 114, and request information 114. In some implementations, the database is actually data storage existing on the manager device 106. PACS 118 contains a database ("PACS data storage 120") which stores key information 122, access request information 124, door status information 126, and door configuration information 128. In some implementations, the system 100 does not include a PACS, such as PACS 118.

A user of the visitor device 102 can make a request 132 to communicate with an occupant over the network. Request 132 can be made through a mobile app, a computer program, or through a website. Request 132 may be sent along with accompanying information, such as a location of the visitor device 102 (e.g., a GPS location), message for the occupant, and/or a request to access the facility. Request 132 and the accompanying information may be stored in the centralized data storage 110 as request information 114. Request information 114 may also include a time at which the request 132 was made. Request 132 may first pass to the centralized computer system 108 which may grant or deny request 132 itself, or it may pass request 132 off to the occupant. Where the centralized computer system 108 determines that request 132 should continue to the occupant, request 132 will be passed on to the occupant device 104.

Request 132 may specify a unit number of the occupant, a floor of the occupant, or a name of the occupant. Based on the specified information, the centralized computer system 108 searches through the stored occupant information 112 to identify the occupant associated with the visitor's request 132. Once the occupant is identified, the centralized computer system 108 may pull up additional information associated with the identified occupant that is stored in occupant information 112 of the centralized data storage 110. This additional information may include, for example, a phone number of the occupant, a name of the occupant, a time period when the occupant accepts requests, a primary means of communication (discussed in more detail below), a secondary means of communication (as discussed in more detail below), an indication to not participate in such communications (e.g., the occupant may be on a no answer list), a neighbor who has agreed to receive the occupant's requests when the occupant is not available (as discussed in more detail below), an indication that the occupant is away or on vacation, etc. This additional information may be used by the centralized computer system 108 to facilitate communication between the visitor and the occupant.

The centralized computer system 108 may store information associated with the visitor who made request 132. This information may be stored under visitor information 114 within the centralized data storage 110 of the centralized computer system 108. This information may include, for example, a name of the visitor, a phone number of the visitor, the type of request made (e.g., did the visitor request access to an entrance of a facility), reason for the request (e.g., delivery, social visit, etc.), affiliations (e.g., FedEx employee), etc. This information may be used by the centralized computer system 108 to facilitate communication between the visitor and the occupant.

In some implementations, the mobile app, computer program, or website may require that the visitor authenticates themselves. Authentication may include requiring the visitor to enter their name, phone number, reason for visiting, etc. This information may then be provided to the centralized computer system 108 for storage. Once a visitor is authenticated, they may be provided an authorization code by the centralized computer system 108. When a visitor makes a request to communicate with an occupant, this authorization code may be provided to the occupant device 104. The occupant device 104 may use the authorization code to access information associated with the visitor, such as, for example, the visitor's name, phone number, and/or reason for visiting.

In some implementations, the visitor is prompted to authenticate themselves when they make a request to communicate with an occupant. In these implementations, the visitor may be required to enter their name, phone number, reason for visiting, etc. This information may then be provided to the centralized computer system 108 for storage. Once a visitor is authenticated, they may be provided a one-time authorization code by the centralized computer system 108. This one-time authorization code may then be provided to the occupant device 104. The occupant device 104 may use the one-time authorization code to access information associated with the visitor, such as, for example, the visitor's name, phone number, and/or reason for visiting.

Where the centralized computer system 108 grants the request itself, the centralized computer system 108 may send the accompanying information to the occupant device 104 and/or may connect the visitor and occupant device 104s through a selected means of communication. A means of communication may have been previously selected by the occupant. The occupant may have selected one or more means of communication, such as a notification, a message, a voice call, and/or a video call. A manager may set, through the manager device 106, a default means of communication that can be overridden by an occupant's selection. As an example, where the centralized computer system 108 grants a request, the centralized computer system 108 may permit the visitor to call the occupant's device. The occupant may be provided options to accept the call, deny/end the call, etc.

Where the centralized computer system 108 passes the request on to the occupant, it sends the request and any accompanying information to the occupant device 104. The user of the occupant device 104 (i.e., the occupant) can then select a response 134. The occupant may choose to accept the communication request or deny the communication request. If the occupant does not respond to the request within a predetermined period of time, the request may be automatically denied.

In some implementations, there are more responses available to the occupant. In these implementations, response 134 may be a voice or touch-tone/keypad response, such that there may be multiple responses, each tied to a number on a keypad. The responses 134 may include, for example, accept/start communication, deny/end communication, accept/start messaging, deny/end messaging, accept/start voice call, deny/end voice call, accept/start video call, deny/end video call, permit facility access (in which case a command would be sent to PACS 118 as discussed below), deny facility access, etc.

Where response 134 is a voice response, the centralized computer system 108 may receive the verbal response and perform voice recognition on the response in order to determine an occupant's instructions. For example, the occupant may respond to the visitor's request 132 through the occupant device 104 by stating "I do not want to talk right now." This verbal response may be provided to the centralized computer system 108 which performs voice recognition on the response. In some implementations, the centralized computer system 108 may convert the response to text and provide this to the visitor device 102 as part of response 134. In some implementations, the centralized computer system 108 can recognize a determination by the occupant to grant or deny request 132 (or can recognize other instructions) after performing voice recognition on the verbal response.

The centralized computer system 108 may deny the request/fail to send the request to the occupant device 104 (deny the request) for a variety of reasons. The centralized computer system 108 may deny the request due to a received location of the visitor device 102 being outside of a predetermined area. The predetermined area may be specified by manager through the manager device 106.

The centralized computer system 108 may deny the request due to the time at which the request was made. An occupant may specify through the occupant device 104 a time period of when they are willing to accept communication requests. This time period may be stored in occupant information 112 of the centralized data storage 110 and associated with the occupant. If the time at which the request is made is not within the specified time period, the centralized computer system 108 may deny the request. Alternatively, the centralized computer system 108 may send the request to a manager if the time at which the request is made is not within the specified time period. Alternatively, the centralized computer system 108 may send the request to a neighbor that has agreed to receive requests directed to the occupant when the occupant is not available if the time at which the request is made is not within the specified time period.

The centralized computer system 108 may deny the request due to the occupant not being within the predetermined area. Alternatively, the centralized computer system 108 may send the request to a manager if the occupant is not within the predetermined area. Alternatively, the centralized computer system 108 may send the request to a neighbor that has agreed to receive requests directed to the occupant when the occupant is not available if the occupant is not within the predetermined area.

The centralized computer system 108 may deny the request due to the occupant indicating that they are away and/or on vacation. Alternatively, the centralized computer system 108 may send the request to a manager if the occupant has indicated that they are away and/or on vacation. Alternatively, the centralized computer system 108 may send the request to a neighbor that has agreed to receive requests directed to the occupant when the occupant is not available if the occupant has indicated that they are away and/or on vacation.

In some implementations, the centralized computer system 108 communicates with a PACS 118. These implementations may be limited to situations where a visitor has requested access to an entrance of the facility through their visitor device 102. PACS 118 may contain a database which stores key information 122, access request information 124 114, door status information 126, and door configuration information 128. In some implementations, the occupant device 104 and visitor device 102 wirelessly communicate with the one or more doors of a facility and of an individual unit. The wireless communication may take place through cellular, Bluetooth, near-field communication (NFC), radio-frequency identification (RFID), and/or Wi-Fi.

The occupant device 104, the manager device 106, and the visitor device 102 may each be a computing device, e.g., a mobile phone, a smart phone, a personal digital assistant (PDA), a tablet computer, a laptop computer, or a desktop computer.

The occupant device 104 may have access to the centralized data storage 110 through the network connection. The occupant device 104 may be able to access their own information, communication requests (e.g., request 132) that they have received, and visitor information 114 belonging to their visitors. In some implementations, an occupant device 104 is also a manager device 106.

An occupant may make a request 136 through occupant device 104 to a manager. This request may be sent to manager device 106. Request may include a request to modify their stored occupant information 112, a request to opt-out of the virtual network system 100, a request to obtain additional permissions, etc. The manager through manager device 106 may provide the occupant a response 138. Response 138 may include an indication of whether the occupant's request was granted or denied.

The visitor device 102 may have access to the centralized data storage 110 through the network connection. The visitor device 102 may be able to access their own communication requests. In some implementations, the visitor is able to access limited information of an occupant. Such information may be limited to the unit number or a floor of an occupant that the visitor attempted to contact. Such information may be limited to a name of an occupant that the visitor attempted to contact when the visitor had originally entered a name of the occupant. In some implementations, the visitor device 102 is also a manger device.

The manager device 106 may have access to the centralized data storage 110 through a direct connection and/or through the network connection to the centralized computer system 108. The manager device 106 has permission to view occupant information 112, visitor information 114, and request information 114. This information may include the GPS locations of the visitor requesting communication at the time the request was made. The manager device 106 is able to access and update occupant information 112 and visitor information 114. In some implementations, the manager device 106 also has access to the PACS data storage 120.

In some implementations, a manager, through the manager device 106, can designate a visitor as an authorized visitor. For example, where a manager determines that a visitor is a delivery person (UPS employee, FedEx employee, USPS employee, etc.), they can designate the visitor as an authorized visitor. Other than delivery personnel, authorized visitors may also include employees of the facility, contractors hired by the facility, etc.

When a visitor is an authorized visitor, an occupant may get an indication of such when the authorized visitor requests to communicate with the occupant. This indication may include a graphical user interface element being displayed on the occupant device 104. The graphical user interface element may include text (e.g., "Authorized Visitor", "Employee", "Delivery Person", "UPS Employee", "FedEx Employee", "USPS Employee", etc.) or a symbol (e.g., a check mark) indicating that the visitor is an authorized visitor.

In some implementations, an authorized visitor is granted permissions and/or access to information not available to unauthorized visitors. For example, an authorized visitor may be able to lookup a name of an occupant, or a name and unit number of an occupant. As another example, an authorized visitor may be granted an access code to gain entry to a facility by the manager device 106. This access code may be permanent, last for specified period of time, work for certain dates and times (e.g., based on the schedule of the authorized visitor), and/or may last longer than an access code provided to a unauthorized visitor.

Figure 14:
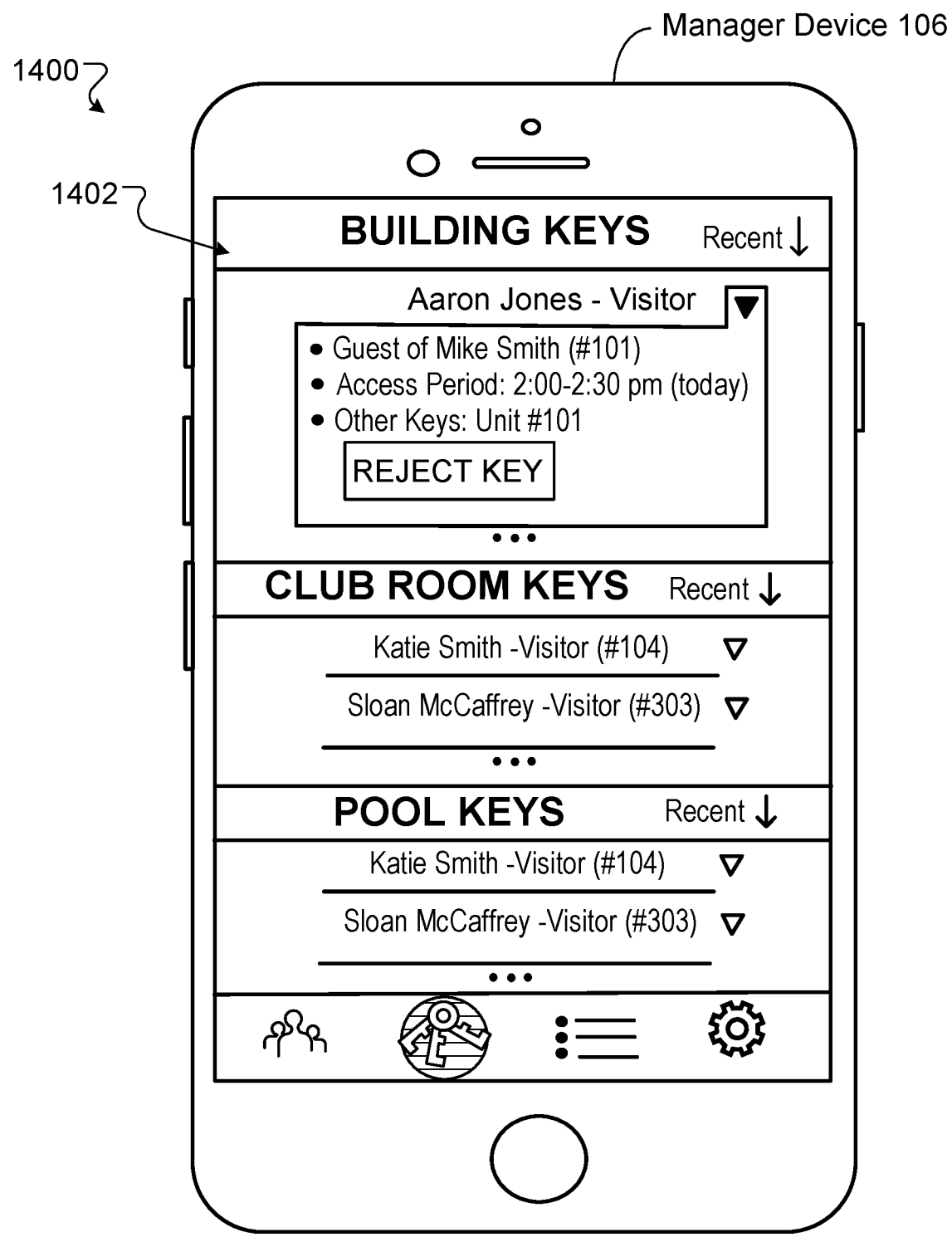

Key information 122, as part of PACS 118, is also shown in FIG. 14, and includes the type of key (complex key—i.e., key to the primary entrances/one or more doors of the facility, club room key, pool key, employee entrance key, delivery entrance key, unit keys, etc.), the access period for that key (this may also include the time left until key expiration), who created the key if it is for a visitor or unit delivery, the unit of person who created the key if it is for a visitor or unit delivery. In some implementations, past key information 122 is stored as part of past occupant information 112. As shown, in the key interface of the manager device 106, a manager may click a downward facing triangle on the right side of a particular key to obtain more information and/or access more controls on that particular key. The additional controls may include a control to reject the particular key, potentially overriding a key made by an occupant.

Door status information 126, as part of PACS 118, is also shown in FIGS. 7A-8B and includes information as to the particular door (here, "Front entrance 206"), whether the particular door is locked or unlocked, and, in some implementations, whether wireless communication between the visitor/occupant device 104 and the door lock has been achieved (see FIGS. 5A-C).

Figure 16:
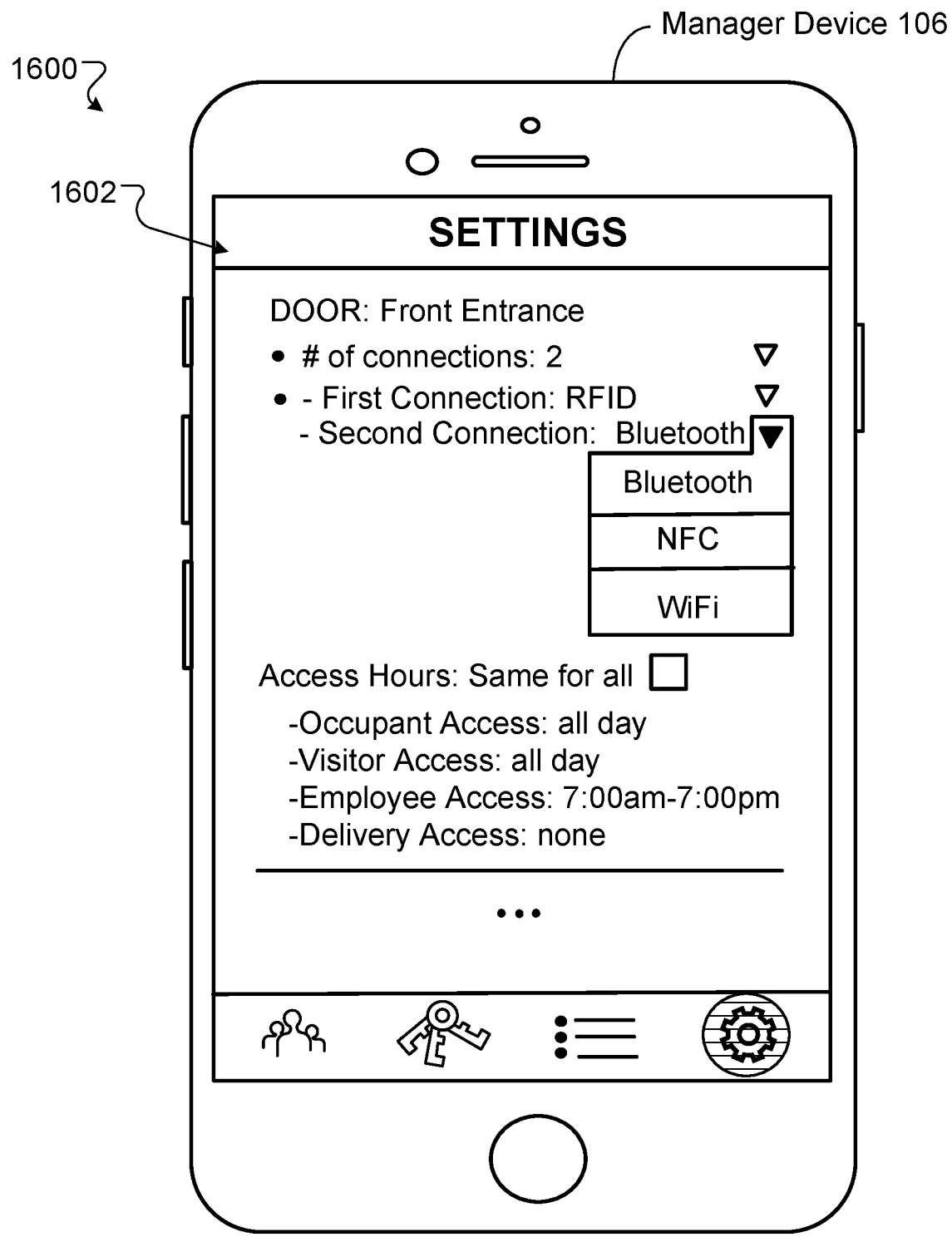

Door configuration information 128, as part of PACS 118, is also shown in FIG. 16 and includes the type of wireless connectivity (e.g., RFID, Bluetooth, NFC, and/or Wi-Fi) for a particular door, and the access hours for each type of entrant (e.g., occupant, visitor, employee, and delivery) for that particular door. As shown, there may be an option in the manager interface to give the same access hours to all entrants. As shown, there may be an option to prevent giving a type of entrant access by giving them "none" for access hours.

Figure 2:
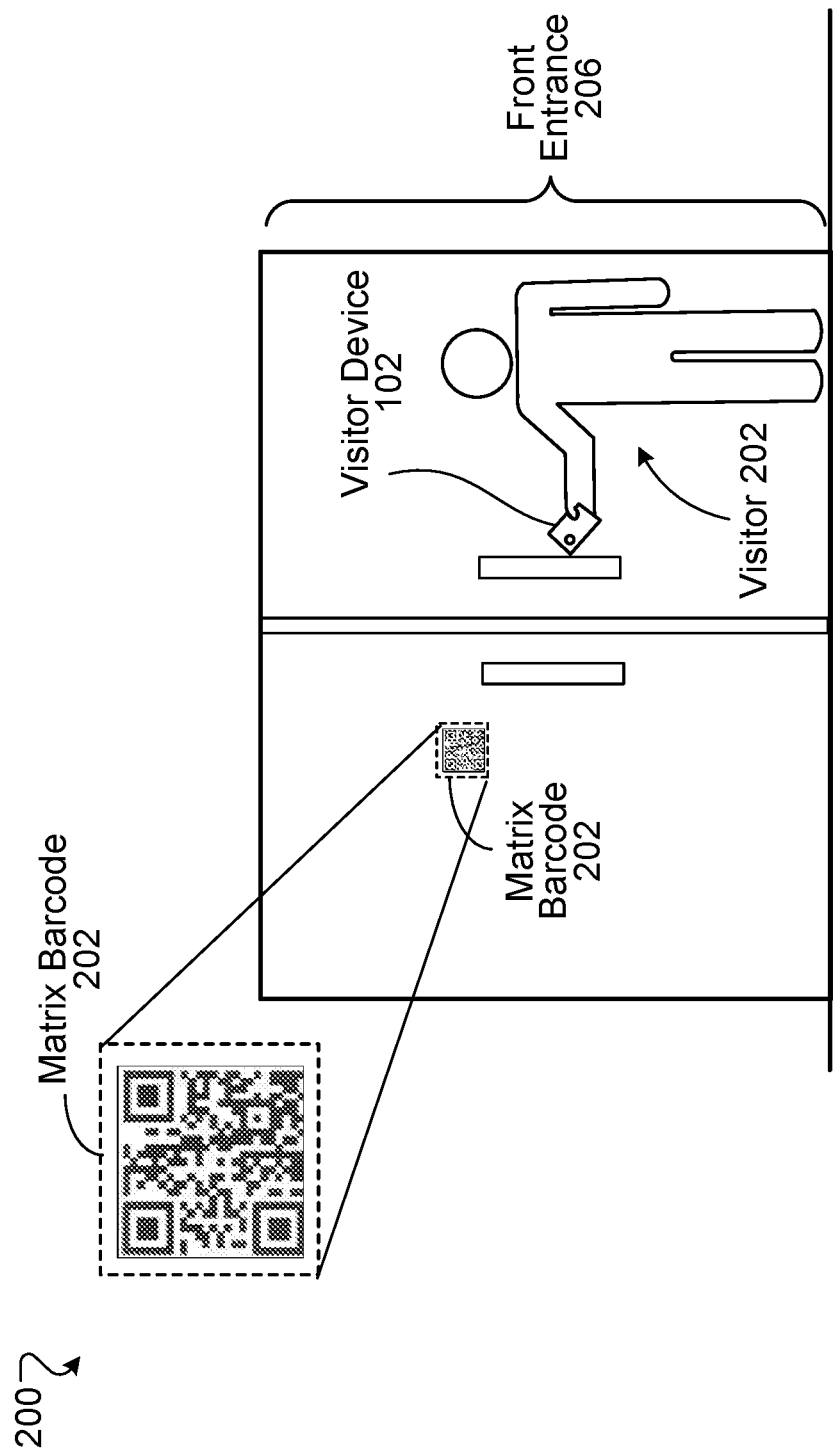
FIG. 2 is a diagram that illustrates an example of a visitor attempting to communicate with an occupant of the facility while the visitor is at a front entrance 206 of a facility.
Figure 3:
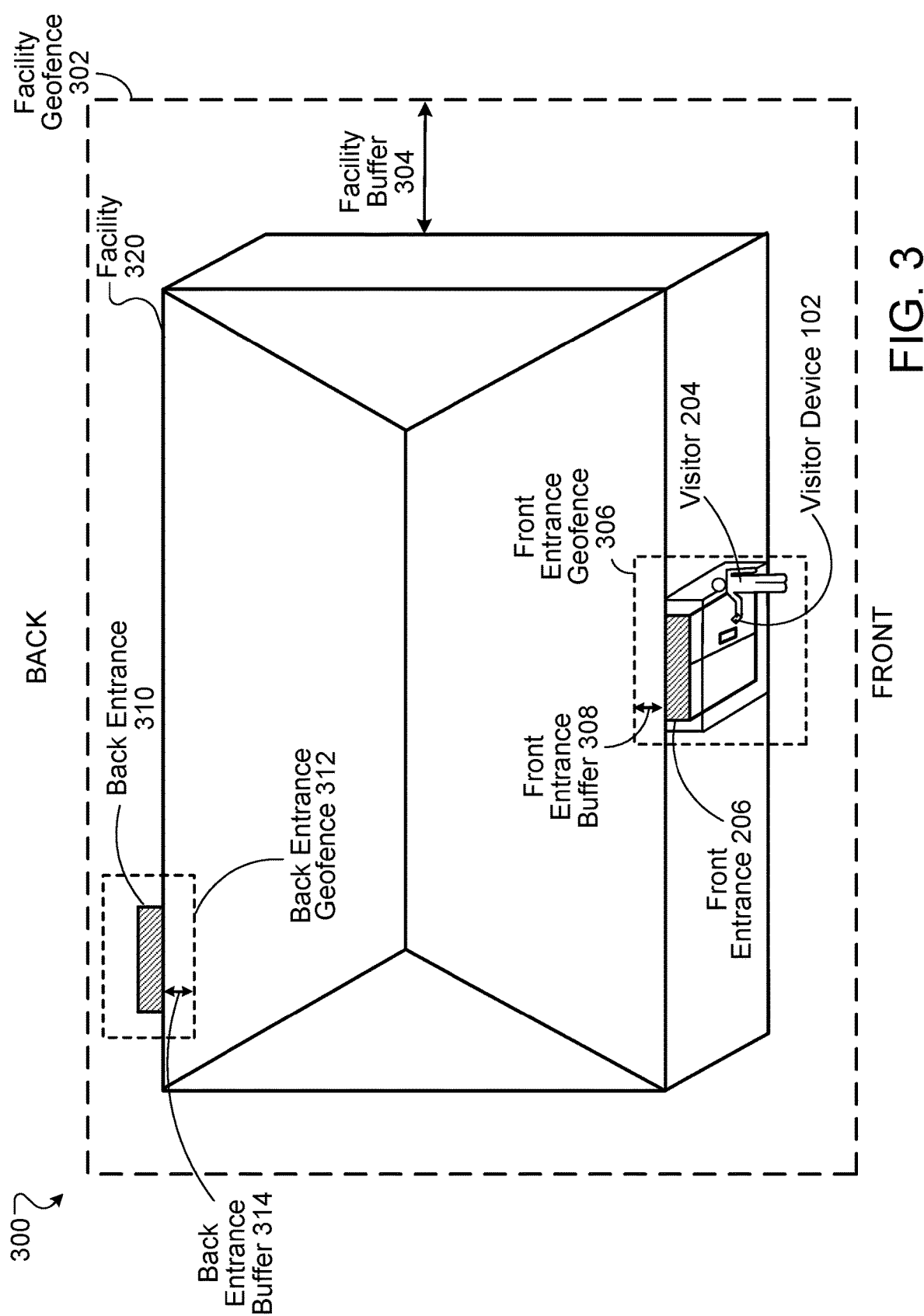
FIG. 3 is an example diagram the use of one or more geofences in order to verify a location of a visitor.

FIG. 2 is a diagram that illustrates an example of a visitor 204 attempting to communicate with an occupant of the facility while the visitor 204 is at a front entrance 206 of a facility (e.g., facility 320 as shown in FIG. 3). In order to download a mobile app or a computer program for communicating with an occupant, or to gain access to a website for communicating with an occupant, a visitor 204 can use their visitor device 102 to obtain an image of a matrix barcode 202 (e.g., a QR code) located on a door of the front entrance 206. The visitor 204 may obtain the image of the matrix barcode 202 through use of a camera on the visitor device 102. The visitor 204 may obtain the image of the matrix barcode 202 through a barcode scanner app on the visitor device 102.

In some implementations, once an image is obtained, the visitor device 102 is directed to website or a digital distribution platform (e.g., Apple's App Store) to download an app (see, e.g., FIGS. 7A-12C) that allows a visitor 204 to communicate with an occupant of the facility. In some implementations, the mobile app also allows a visitor 204 to request access to an entrance of a facility (e.g., request 132 as shown in FIG. 1).

In other implementations, the matrix barcode 202 specifies an SSID, encryption type, and password/passphrase of a Wi-Fi network of the facility. In these implementations, when the visitor scans the matrix barcode 202, the visitor device 102 can join the facility's Wi-Fi network without having to manually enter data. As will be discussed in more detail below, the Wi-Fi connection between the visitor device 102 and the network can be used to estimate a location of the visitor in place of a GPS location.

In yet other implementations, there might not be a matrix barcode 202 but simply information on how to download the facility communication app/computer program. In yet other implementations, there might not be a matrix barcode 202 but simply a Wi-Fi network login information posted on each entrance of a facility. Again, when a Wi-Fi connection is established between the visitor device 102 and the network, it can be used to estimate a location of the visitor 204 in place of a GPS location.

Once a visitor 204 has access to the mobile app, computer program, or website, the visitor can request to communicate with an occupant of the facility. When a visitor 204 makes this request a location of the visitor device 102 is sent to the centralized computer system 108 (as shown in FIG. 1). This location may be provided by a GPS unit on the visitor device 102. In some implementations, the location of the visitor 204 is estimated based on the visitor device 102 connecting to a Wi-Fi of the facility. In these implementations, a GPS location does not need to be provided. In these implementations, the centralized computer system 108 may still require the GPS location of the visitor device 102 and use it to confirm the location of the visitor 204 and/or visitor device 102.

FIG. 3 is diagram that illustrates a facility 320 having multiple entrances (front entrance 206 and back entrance 310). As shown, the visitor 204 (also shown in FIG. 2) is attempting to communicate with an occupant while at the front entrance 206 of the facility 320 through use of their visitor device 102 (the visitor may also be requesting access to the front entrance 206). In some implementations, before sending a communication request from the visitor 204 to an occupant of the facility 320, the system 100 (as shown in FIG. 1) will implement one or more geofences in order to verify that the visitor device 102 is within one or more predetermined areas. In some implementations, there is a single area that surrounds the entirety of the facility ("facility geofence 302"). In these implementations, the area may include a buffer ("facility buffer 304") and, therefore, encompass an area greater than the area of the facility itself. This would allow the visitor to make a request when they are close to the facility 320 and would account for any slight to moderate errors in the GPS reading of the visitor device 102.

In other implementations, there is a perimeter for each entrance of the facility. In these implementations, the perimeter(s) may include a buffer (e.g., "front entrance buffer 308" and "back entrance buffer 314") and, therefore, encompass an area greater than the area taken by each respective entrance itself. This would allow the visitor 204 to make a request when they are close to an entrance of the facility 320 and would account for any slight errors in the GPS reading of the visitor device 102. For example, as shown in FIG. 3, there is a front entrance geofence 306 with a front entrance buffer 308 and a back entrance geofence 312 with a back entrance buffer 314.

In other implementations, a facility geofence is used in conjunction with one or more smaller entrance geofences (e.g., geofences 306 and 312). In other implementations, instead of implementing a geofence, the system (as shown in FIG. 1) uses the visitor device 102's connection to a Wi-Fi of the facility 320 to determine that the visitor device 102 (and therefore the visitor 204) is sufficiently close to the facility so that a request from the visitor can be sent to the occupant.

A manager may set the geofences for permitting communication and/or access to the facility. The manager may set the geofences through manager device 106 (as shown in FIG. 1). A manager may set the buffer size for a geofence (e.g., a buffer of 10 ft surrounding the facility). A manager may choose not to include a buffer (e.g., by setting the buffer size to 0). A manager may choose whether to implement a facility geofence (e.g., geofence 302) or an entrance geofence (e.g., geofences 306 and 312), or both. A manager may choose whether to require a GPS location of the visitor 204 (e.g., through a GPS unit located on visitor device 102) or would also permit other indications of location (e.g., the visitor device 102's connection to the facility's Wi-Fi). In some implementations, a manager, through the manager device 106, can draw a custom geofence.

Similarly, before unlocking an entrance to the facility 320 (i.e., before the centralized computer system 108 as shown in FIG. 1 sends a command to PACS 118), PACS 118 (as shown in FIG. 1) may receive from the centralized computer system 108 the same one or more geofences in order to verify that the visitor device 102 is still within the one or more predetermined perimeters. In other implementations, instead of implementing a geofence, PACS 118 (as shown in FIG. 1) may receive an indication from the centralized computer system 108 that the visitor device 102 is connected to the facility 320's Wi-Fi and then uses the visitor device 102's connection to a Wi-Fi of the facility to determine that the visitor device 102 (and therefore the visitor) is sufficiently close to the facility 320 so that an entrance of the facility 320 may be unlocked.

In some implementations, instead of the centralized computer system 108 sending a command to PACS 118, the occupant provides the visitor 204 an access code through the established communication between the occupant and the visitor 204. This access code may be a one-time access code (e.g., single-use access code). The visitor 204 may use this code to gain entry to the facility 320 by, for example, entering the code into a PACS interface (e.g., through a physical keypad, virtual keypad on a graphical interface, vocally through a microphone, etc.) or through smart lock application (e.g., Latch) if the facility uses smart locks. In these implementations, the system 100 for facilitating communication between an occupant of a facility and a visitor 204 does not necessarily include PACS 118 (as shown in FIG. 1).

In some implementations, instead of the centralized computer system 108 sending a command to PACS 118 (as shown in FIG. 1), the occupant or occupant device 104 provides the visitor 204 an access code through a separate application, such as, for example, a smart lock application (e.g., Latch).

In order to determine that a visitor device 102 (and therefore the visitor) is within one or more predetermined perimeters, the system 100 (as shown in FIG. 1) obtains a location of the visitor device 102 through a GPS receiver of the visitor device 102. The system 100 may obtain a first location of the visitor device 102 when the visitor 204 accesses the mobile app/computer program/website and sends a request 132 (as shown in FIG. 1) to an occupant. The system 100 may obtain a second location of the visitor device 102 before sending an unlock command (e.g., included in response 134 as shown in FIG. 1) to PACS 118 to unlock an entrance of the facility 320 if the occupant grants such a request (see FIGS. 19A-21B).

Where an occupant does not respond to a visitor's request 132 (as shown in FIG. 1), the system 100 (as shown in FIG. 1) may determine if the occupant for the unit that a request was sent to signed up for a neighbor system. The neighbor system will allow a request intended for an occupant of a unit of the facility to be sent to a neighbor of the occupant. The neighbor will then be permitted to grant the request 132. In some implementations, when the neighbor also fails to respond or if the occupant has not signed-up for the neighbor system, the request 132 may be sent to a manager.

Where an occupant wishes not to participate in the smart entrance system of the facility, either the visitor 204 will not see the unit associated with the non-participating occupant in the directory of units in the mobile app/computer program/website or they will receive an error message in the mobile app/computer program/website when they attempt to send a request 132 (as shown in FIG. 1) to the non-participating occupant of that unit.

Figure 4:
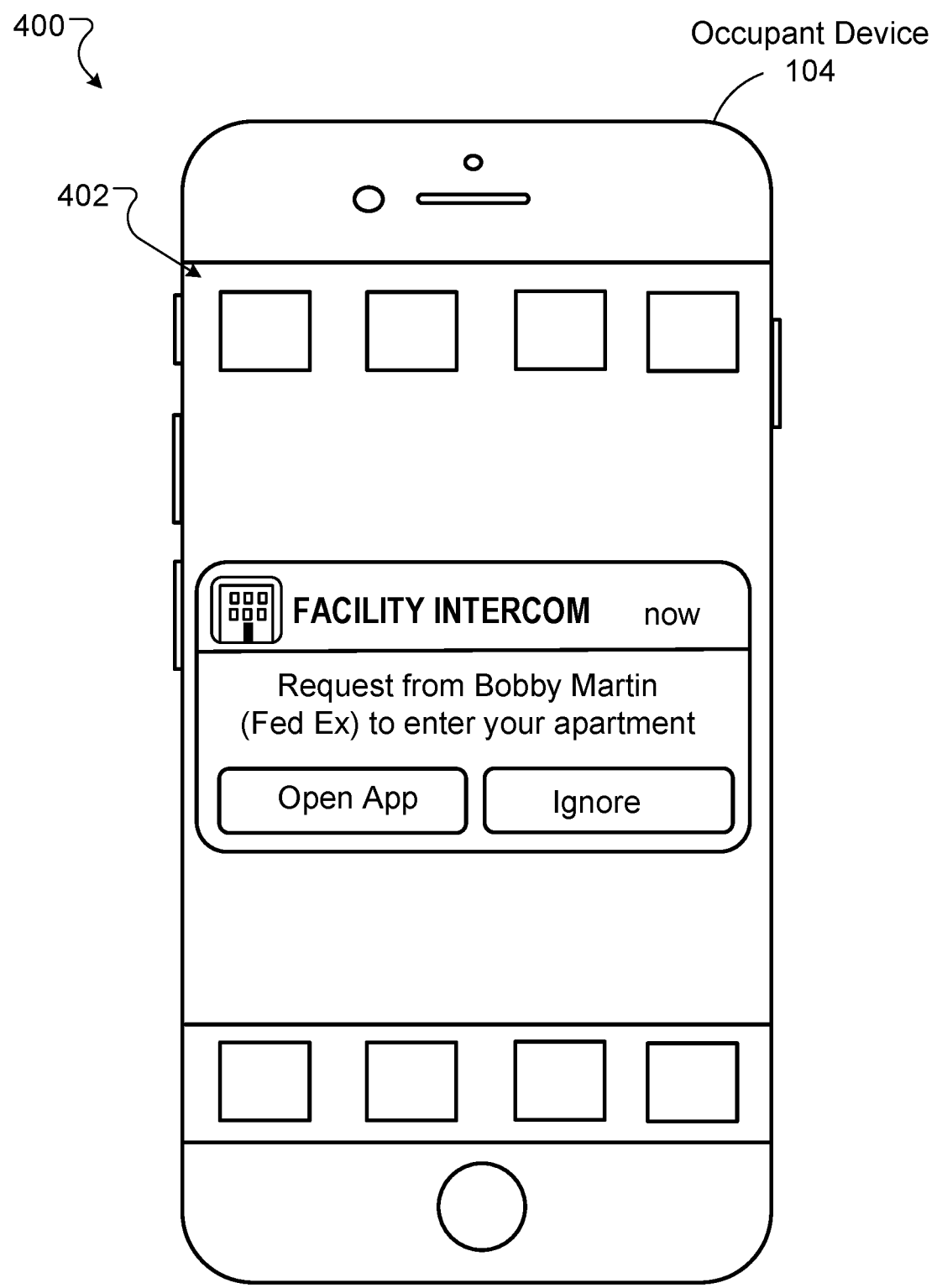
FIGS. 4-5 are example diagrams of receiving virtual intercom notifications through an interface of an occupant device.

FIG. 4 is an example diagram 400 of receiving a virtual intercom notification through a graphical user interface 402 of occupant device 104. The interface 402 depicts the occupant device 104 receiving a notification from the "Facility Intercom" mobile app. In some implementations, "Facility Intercom" represents a computer program and the notification is from the computer program. In some implementations, "Facility Intercom" represents a website and the notification is from the website.

Figure 5:
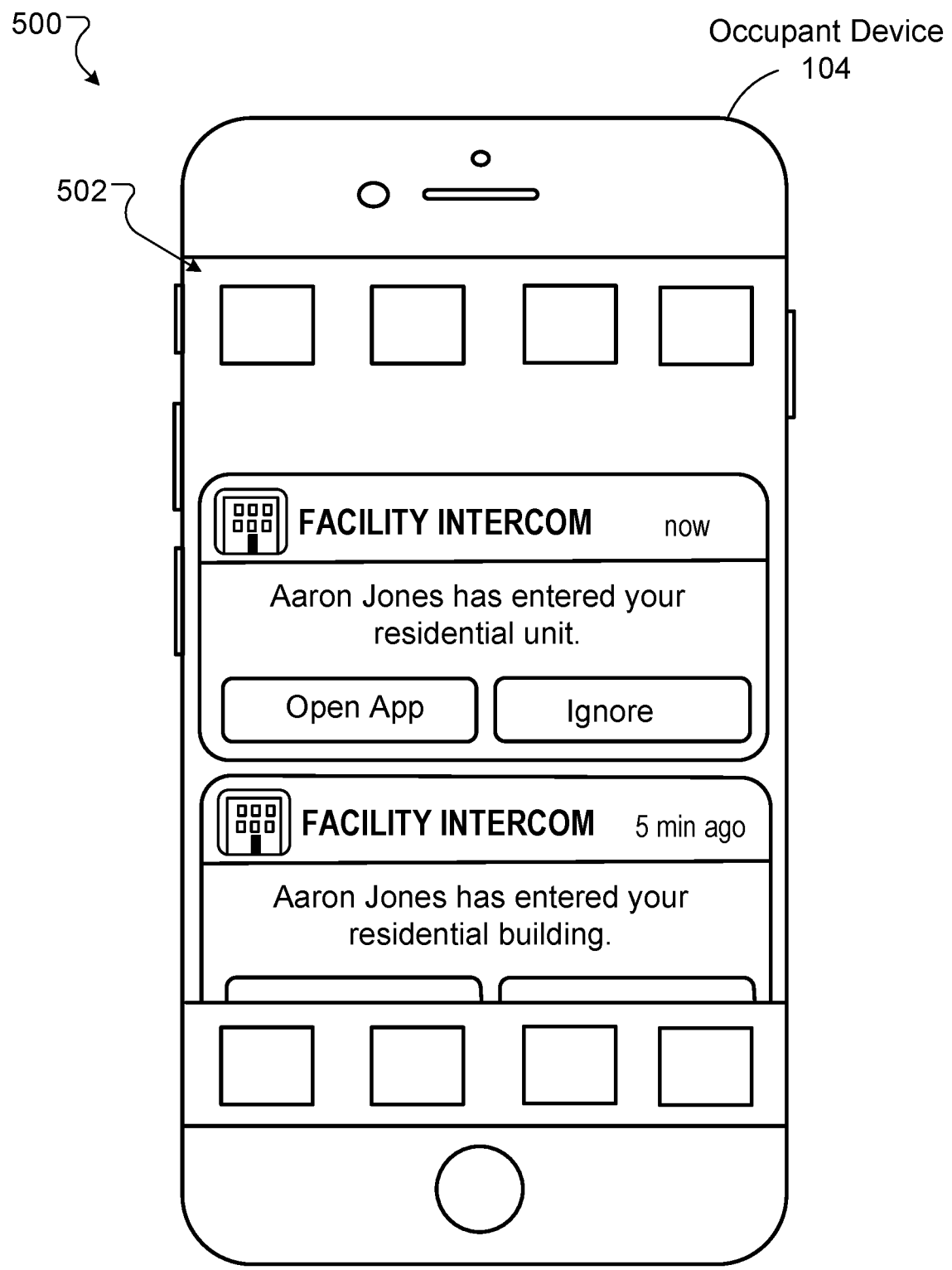

FIG. 5 is an example diagrams 500 of receiving virtual intercom notifications through a graphical user interface 502 of occupant device 104. The interface 502 depicts the occupant device 104 receiving two notifications from the "Facility Intercom" mobile app. In some implementations, "Facility Intercom" represents a computer program and the notification is from the computer program. In some implementations, "Facility Intercom" represents a website and the notification is from the website.

Figure 6:
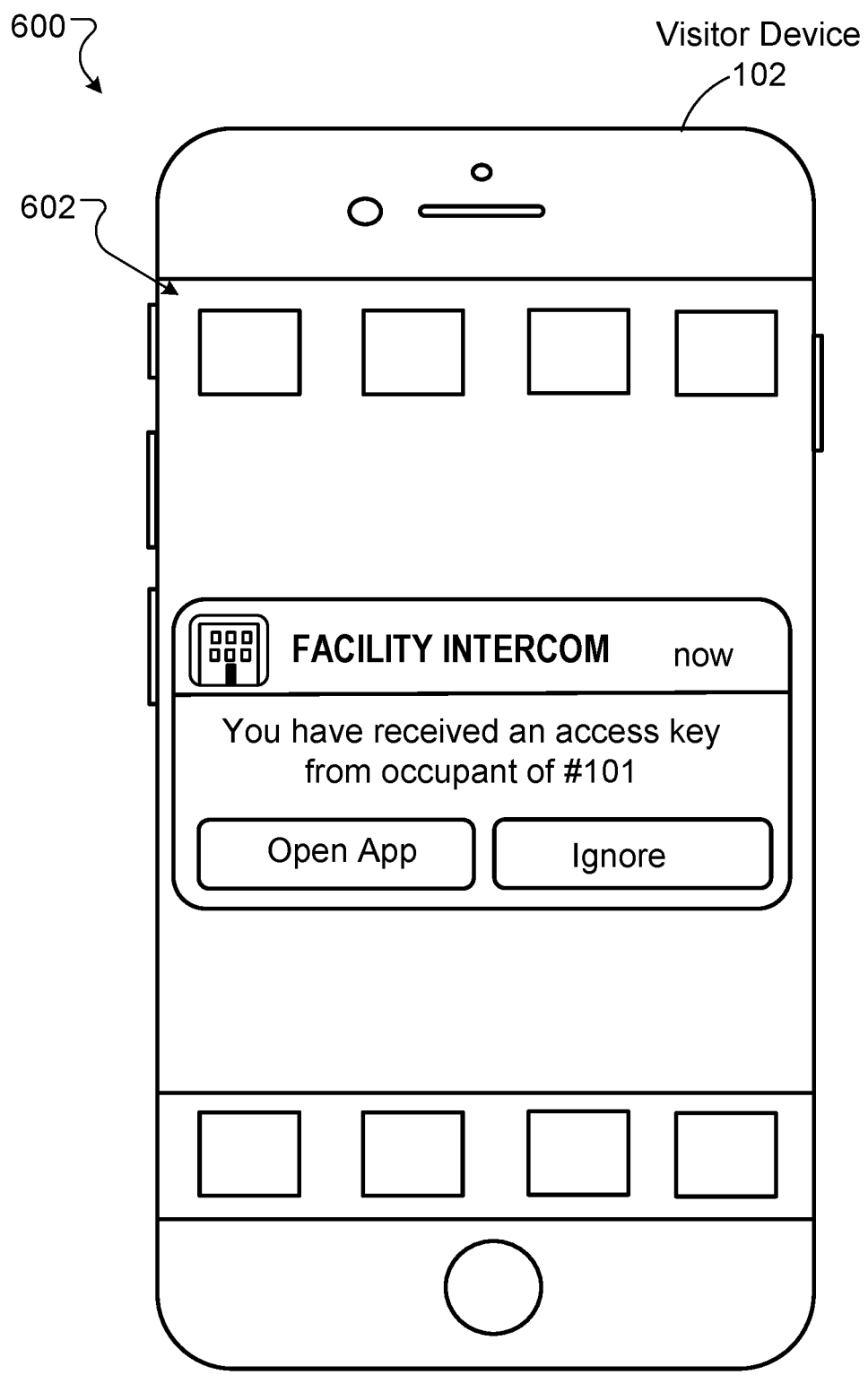
FIG. 6 is an example diagram of receiving a virtual intercom notification through an interface of a visitor device.

FIG. 6 is an example diagram 600 of receiving a virtual intercom notification through an interface 602 of visitor device 102. The interface 602 depicts the visitor device 102 receiving two notifications from the "Facility Intercom" mobile app. In some implementations, "Facility Intercom" represents a computer program and the notification is from the computer program. In some implementations, "Facility Intercom" represents a website and the notification is from the website.

Figure 7A:
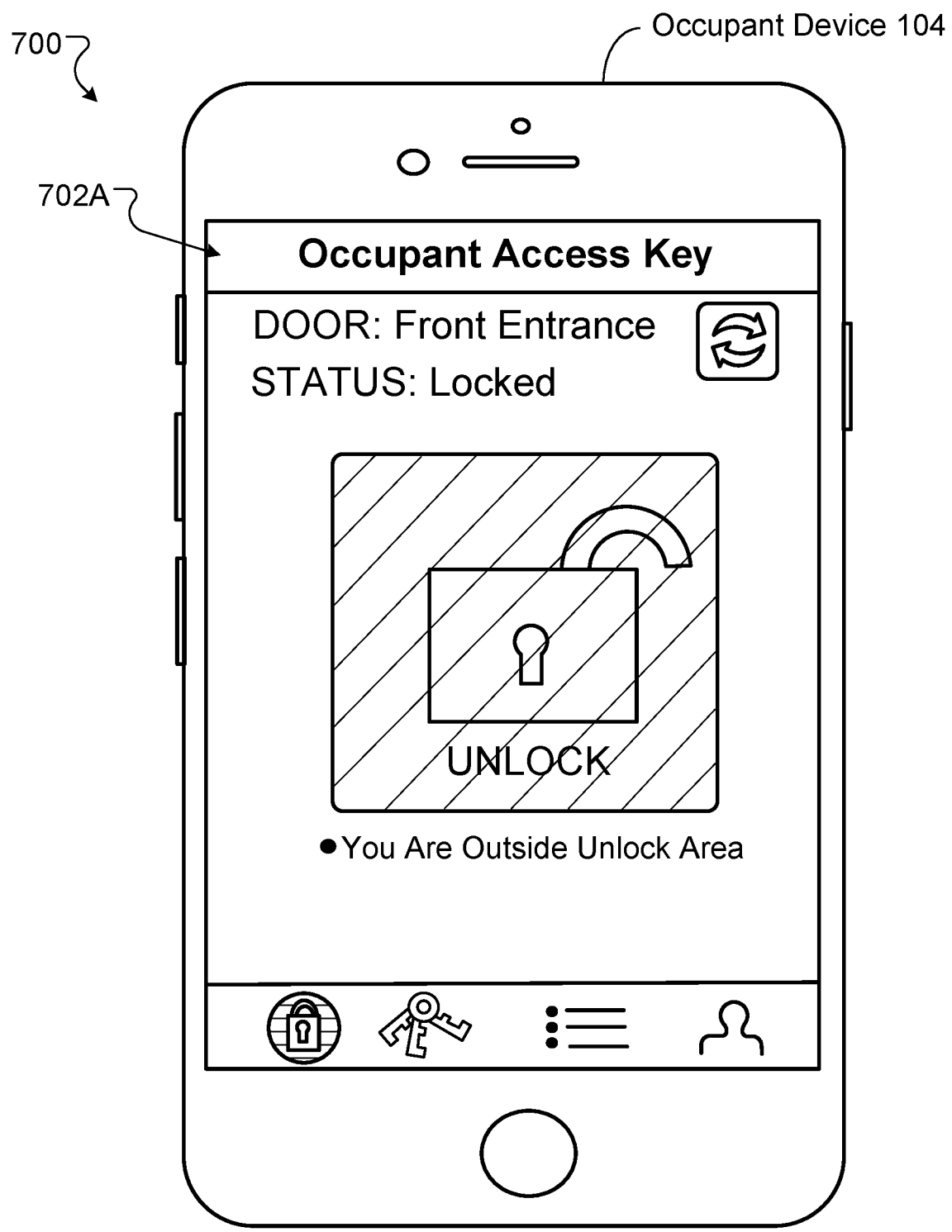
FIGS. 7A-12C are example diagrams of interfaces for a virtual intercom app, program, or website displayed on an occupant's and/or visitor's device.

FIG. 7A is an example diagram 700 of interface 702A for a virtual intercom app, program, or website displayed on occupant device 104.

Figure 7B:
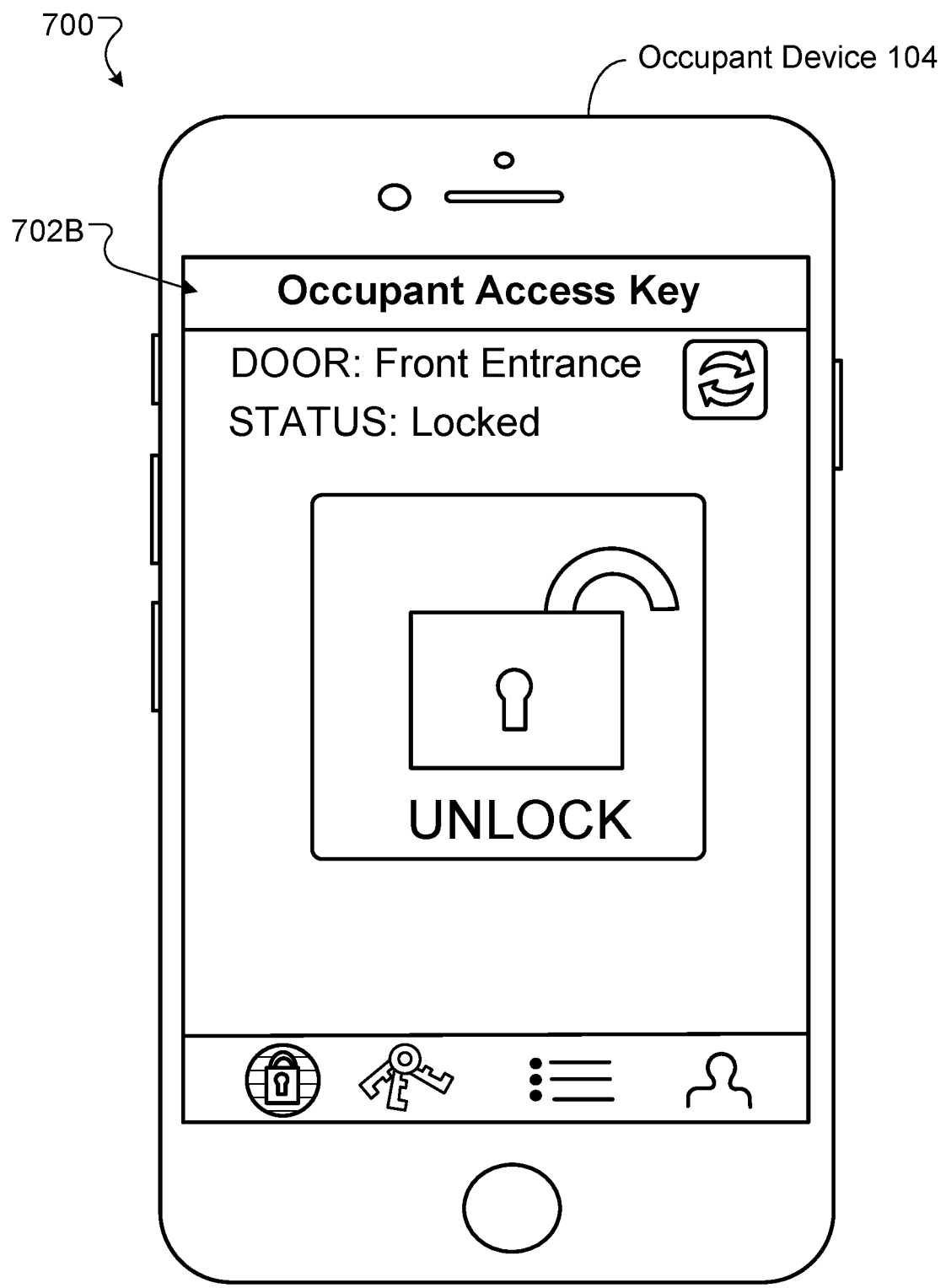

FIG. 7B is an example diagram 700 of interface 702B for a virtual intercom app, program, or website displayed on occupant device 104.

Figure 7C:
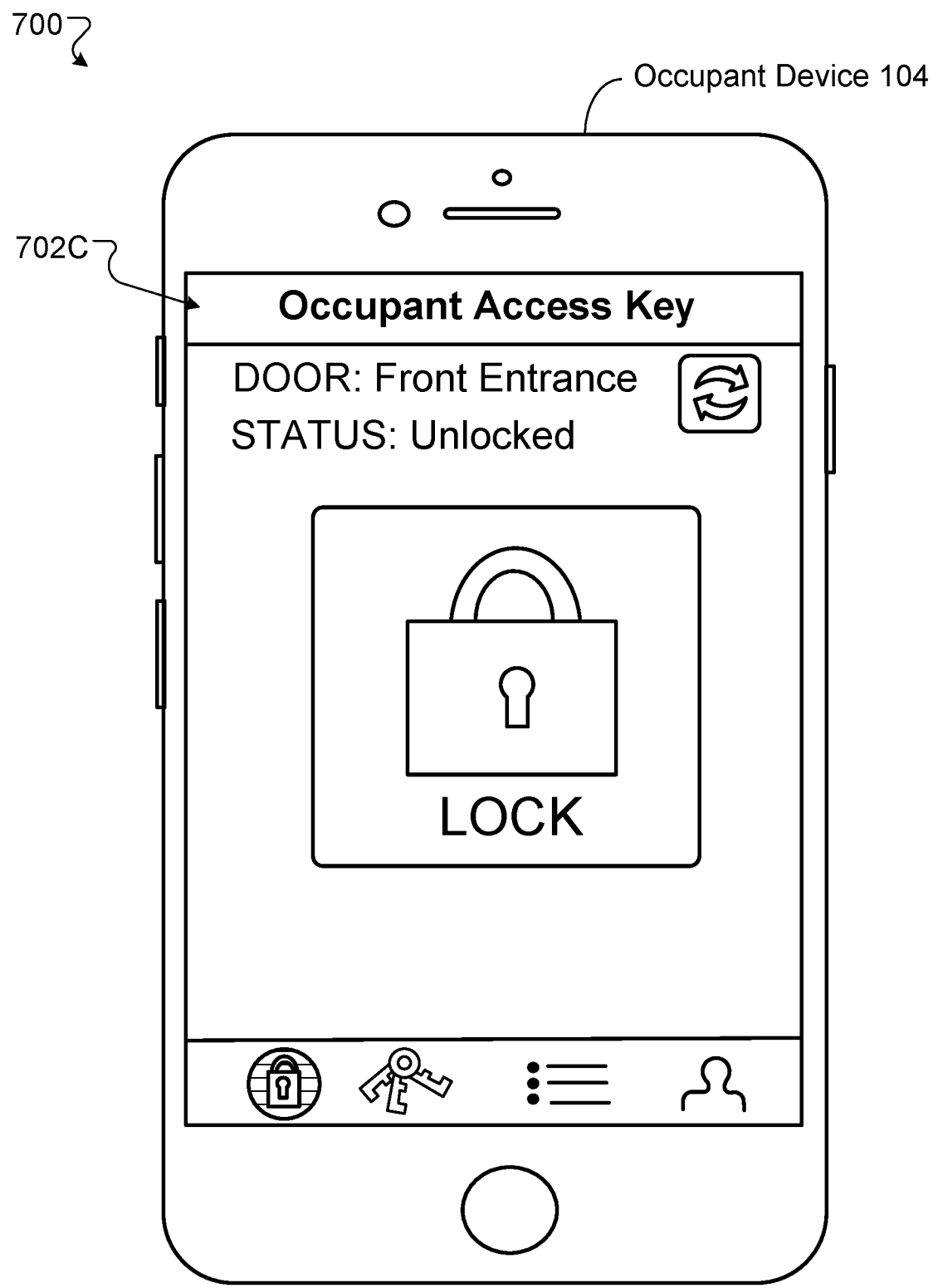

FIG. 7C is an example diagram 700 of interface 702C for a virtual intercom app, program, or website displayed on occupant device 104.

Figure 8A:
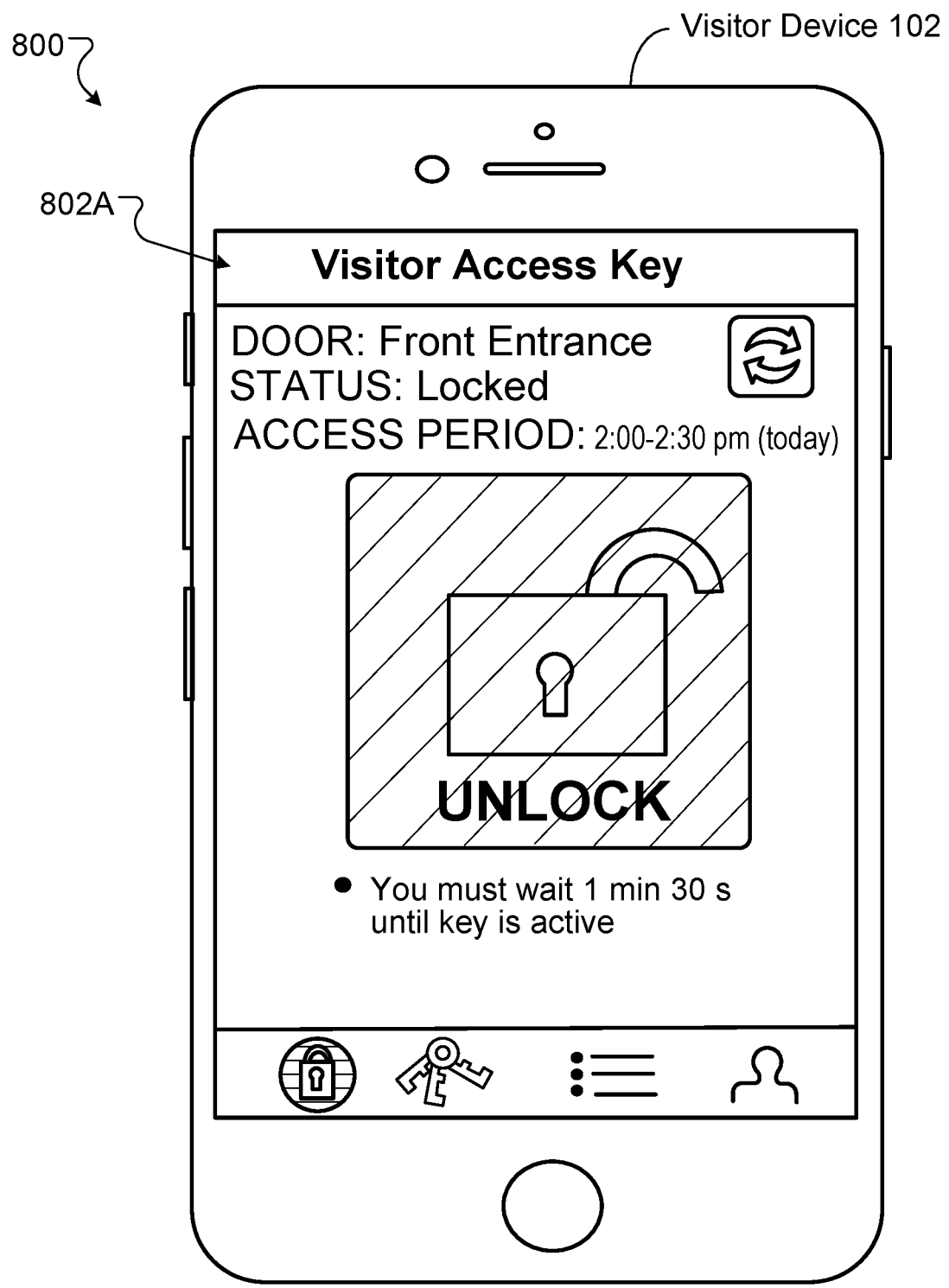

FIG. 8A is an example diagram 800 of interface 802A for a virtual intercom app, program, or website displayed on visitor device 102.

Figure 8B:
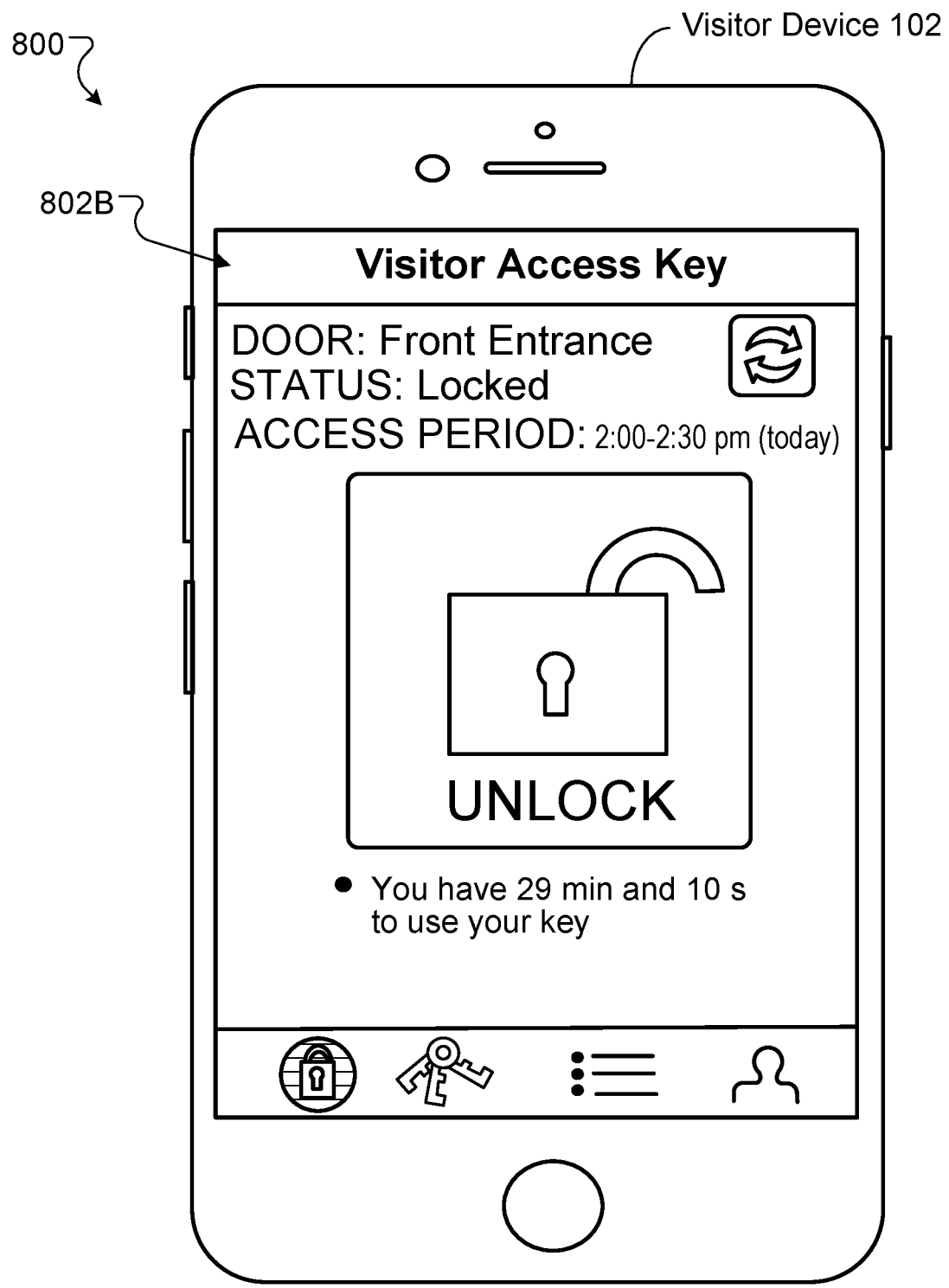

FIG. 8B is an example diagram 800 of interface 802B for a virtual intercom app, program, or website displayed on visitor device 102.

Figure 9:
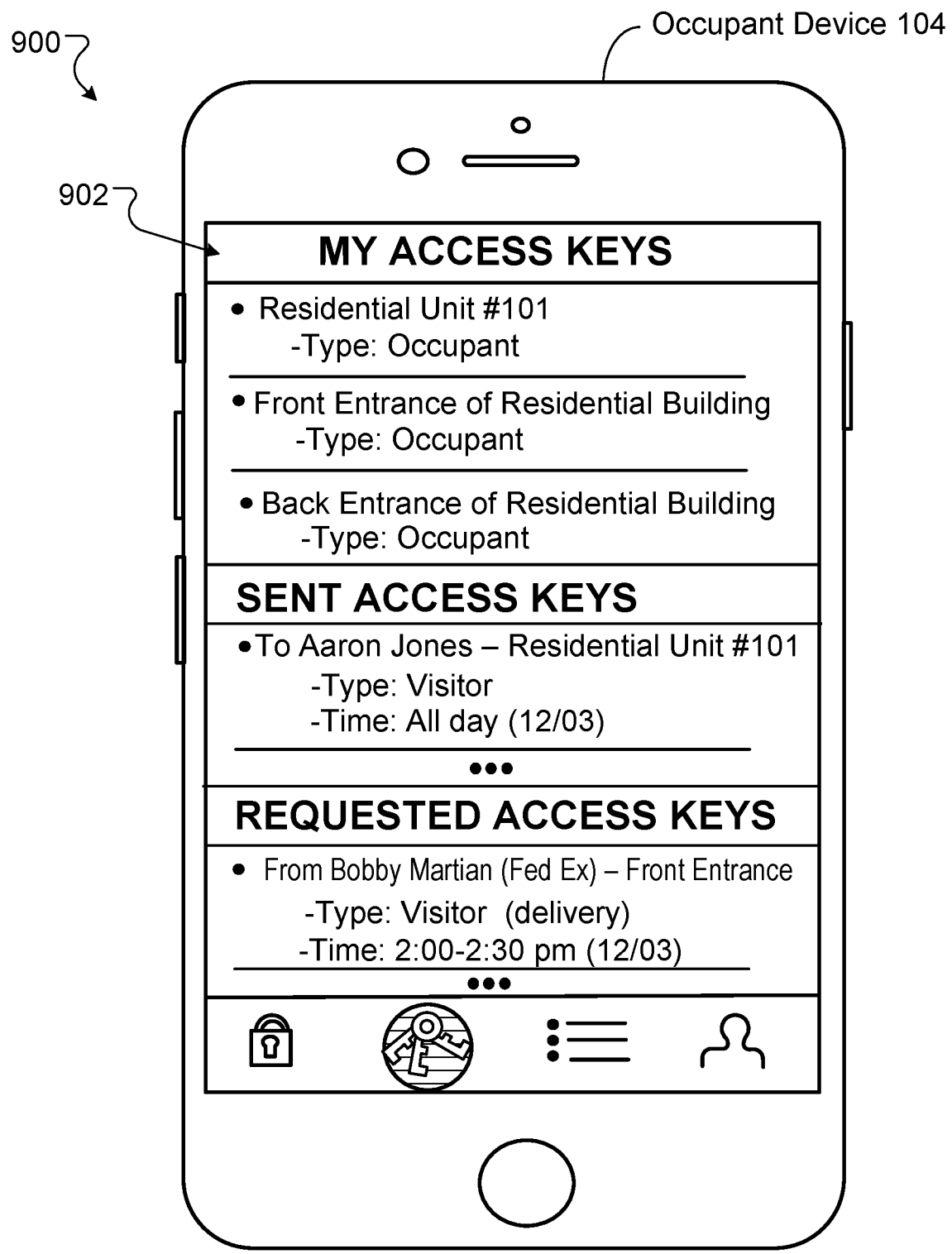

FIG. 9 is an example diagram 900 of interface 902 for a virtual intercom app, program, or website displayed on occupant device 104.

Figure 10:
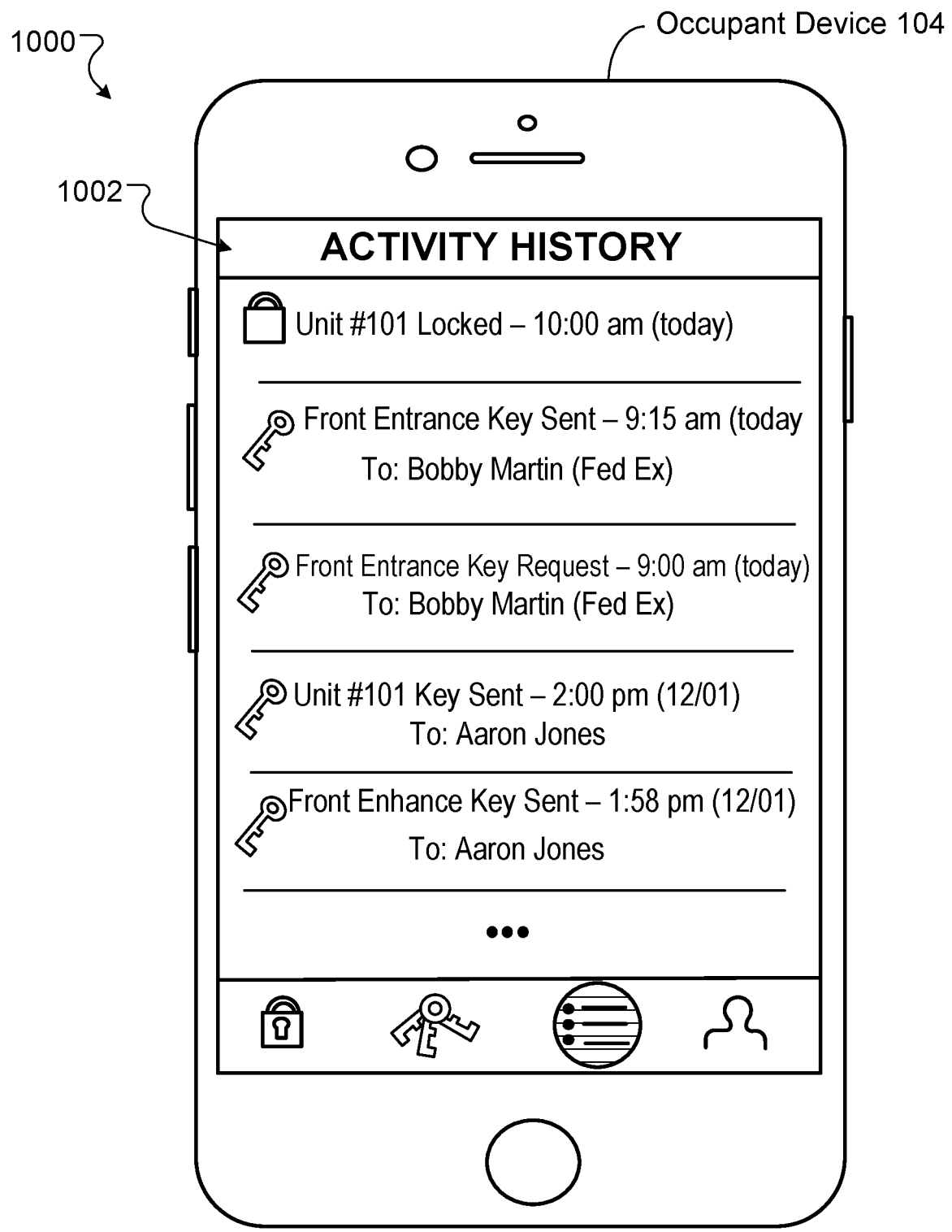

FIG. 10 is an example diagram 1000 of interface 1002 for a virtual intercom app, program, or website displayed on occupant device 104.

Figure 11:
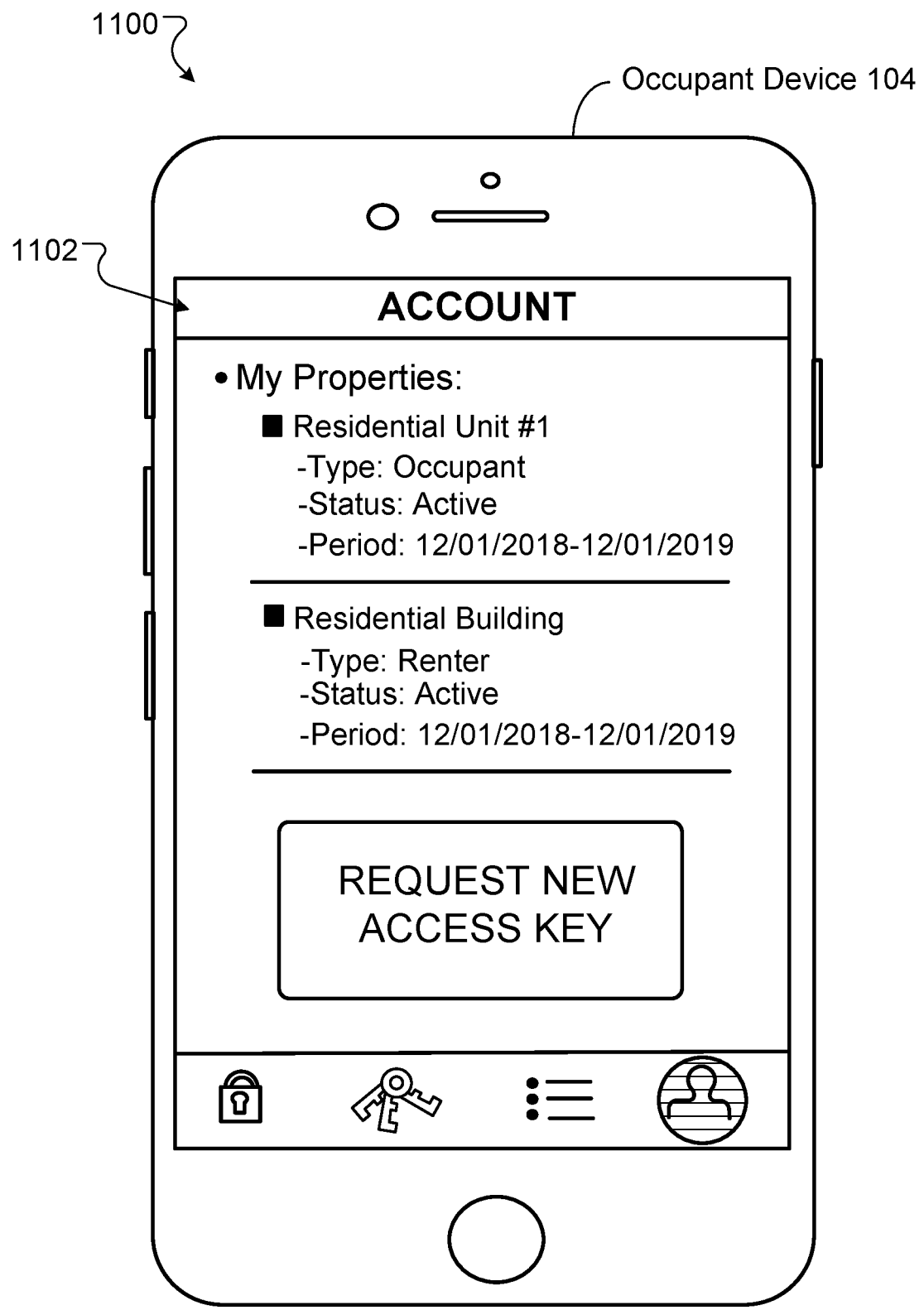

FIG. 11 is an example diagram 1100 of interface 1102 for a virtual intercom app, program, or website displayed on occupant device 104.

Figure 12A:
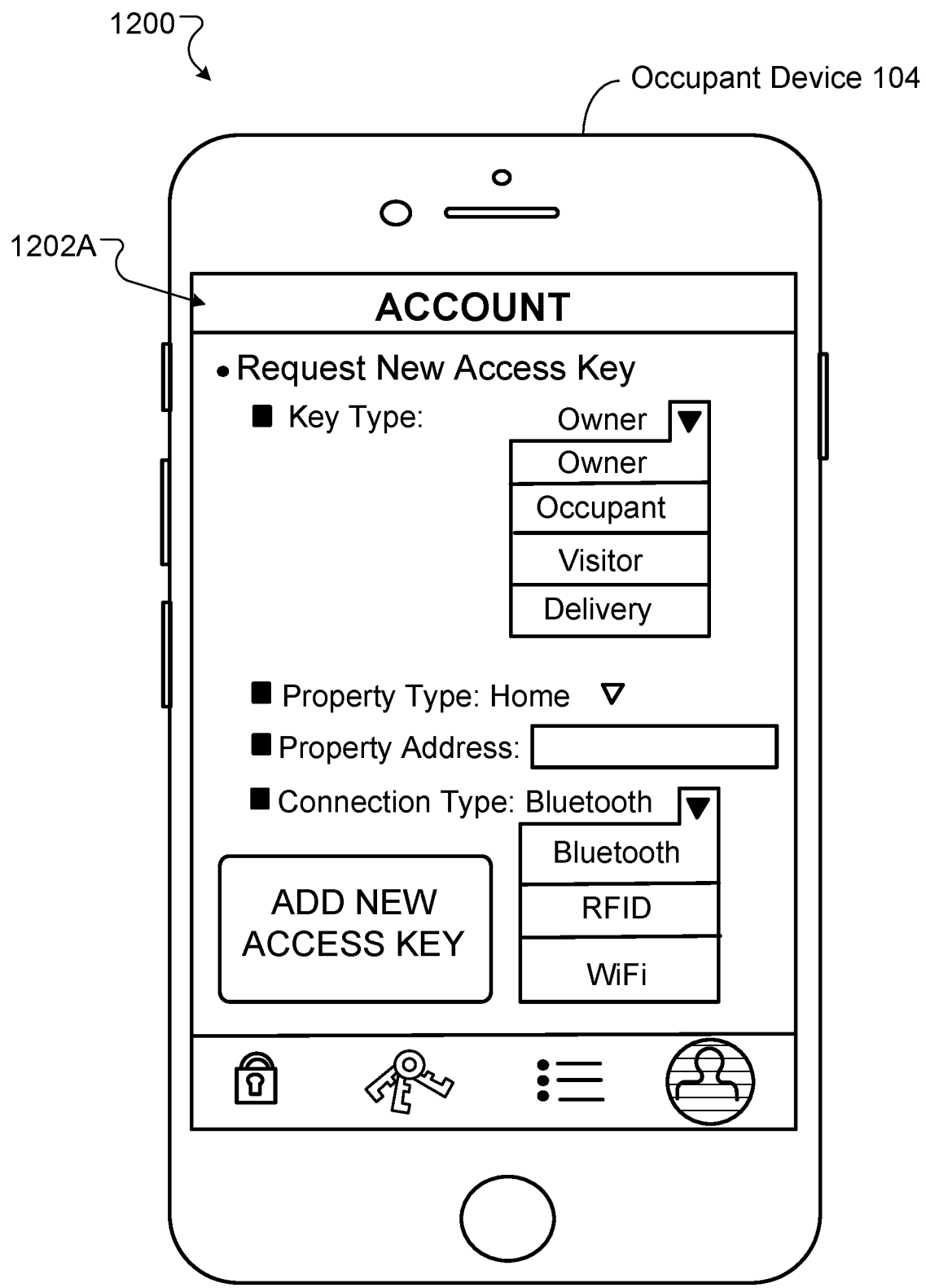

FIG. 12A is an example diagram 1200 of interface 1202A for a virtual intercom app, program, or website displayed on occupant device 104. In some other implementations, diagram 1200 is a diagram of interface 1202A for a virtual intercom app, program, or website displayed on visitor device 102.

Figure 12B:
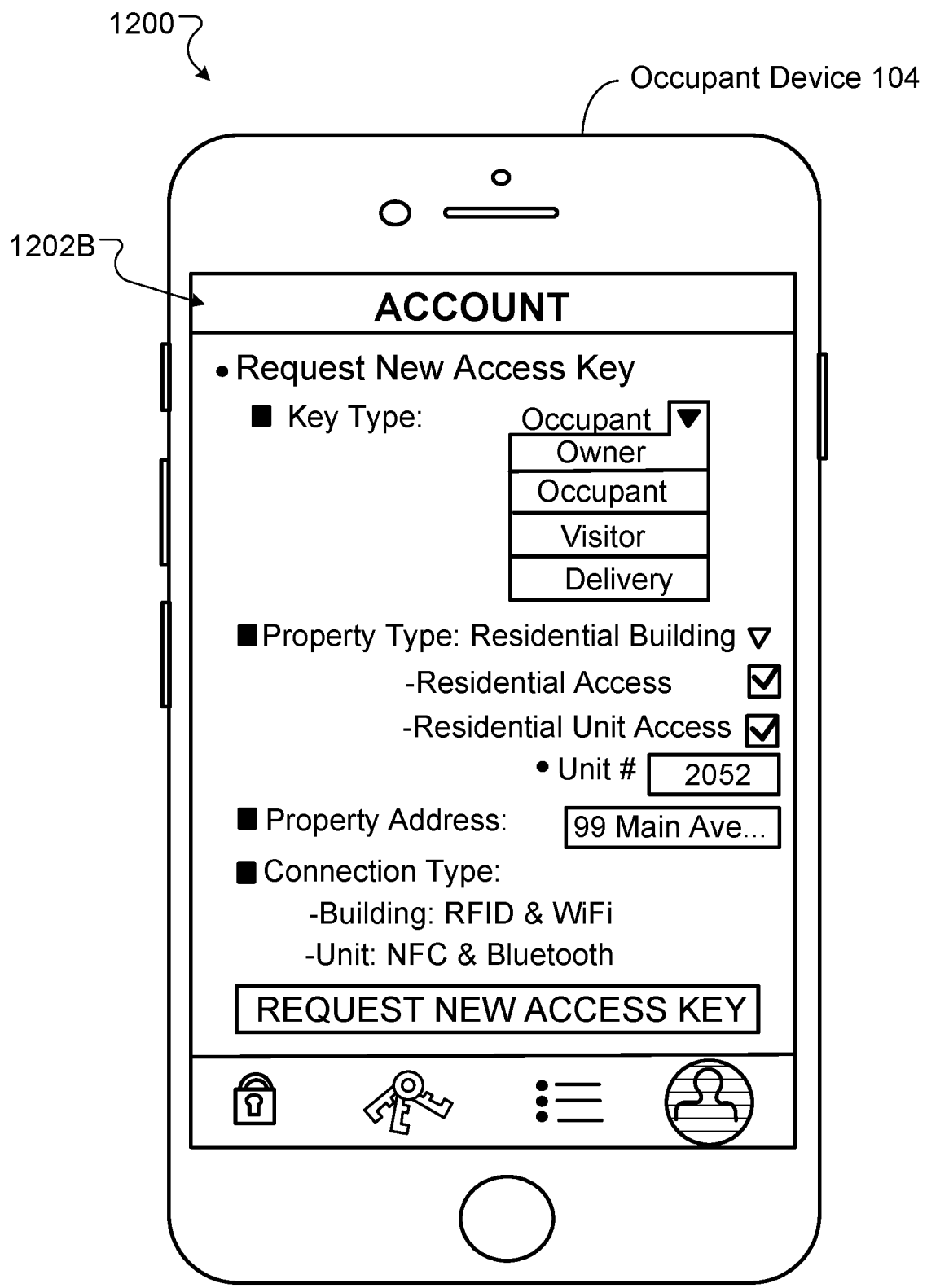
Figure 12C:
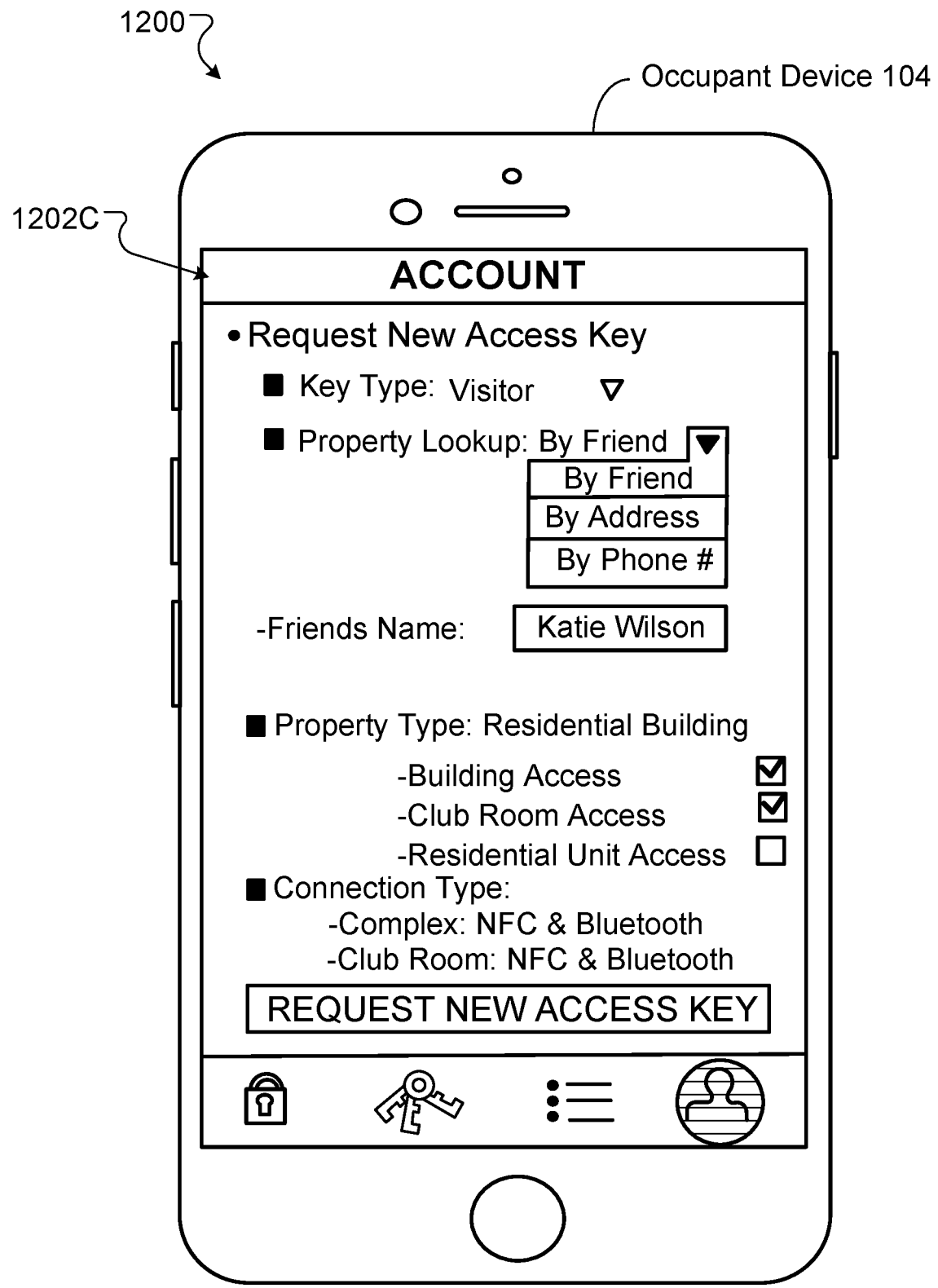

FIG. 12B is an example diagram 1200 of interface 1202B for a virtual intercom app, program, or website displayed on occupant device 104. In some other implementations, diagram 1200 is a diagram of interface 1202B for a virtual intercom app, program, or website displayed on visitor device 102.

FIG. 12B is an example diagram 1200 of interface 1202C for a virtual intercom app, program, or website displayed on occupant device 104. In some other implementations, diagram 1200 is a diagram of interface 1202C for a virtual intercom app, program, or website displayed on visitor device 102.

Figure 13A:
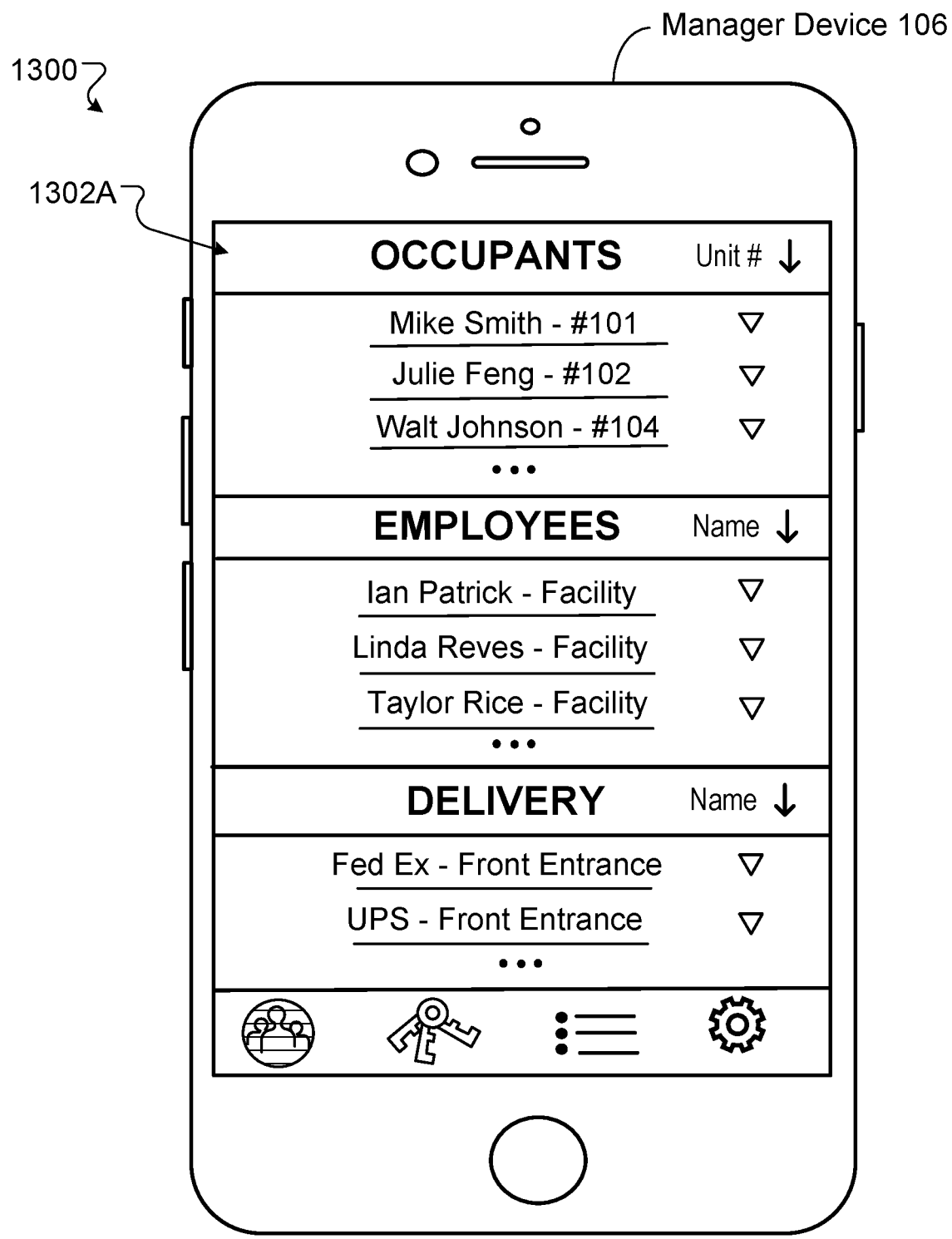
FIGS. 13A-16 are example diagrams of interfaces for a virtual intercom app, program, or website displayed on a manager device.

FIG. 13A is an example diagram 1300 of interface 1302A for a virtual intercom app, program, or website displayed on manager device 106.

Figure 13B:
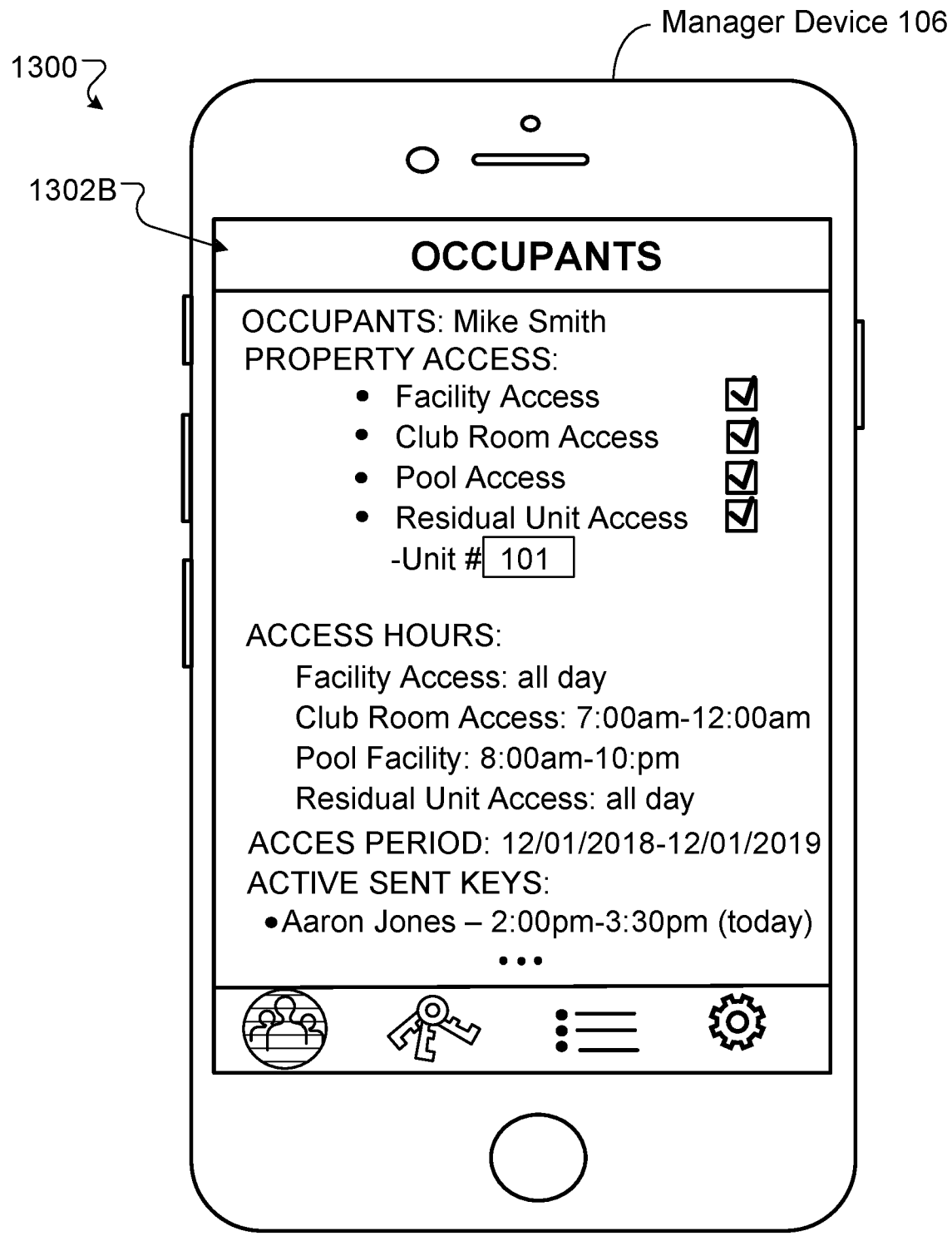

FIG. 13B is an example diagram 1300 of interface 1302B for a virtual intercom app, program, or website displayed on manager device 106.

FIG. 14 is an example diagram 1400 of interface 1402 for a virtual intercom app, program, or website displayed on manager device 106.

Figure 15:
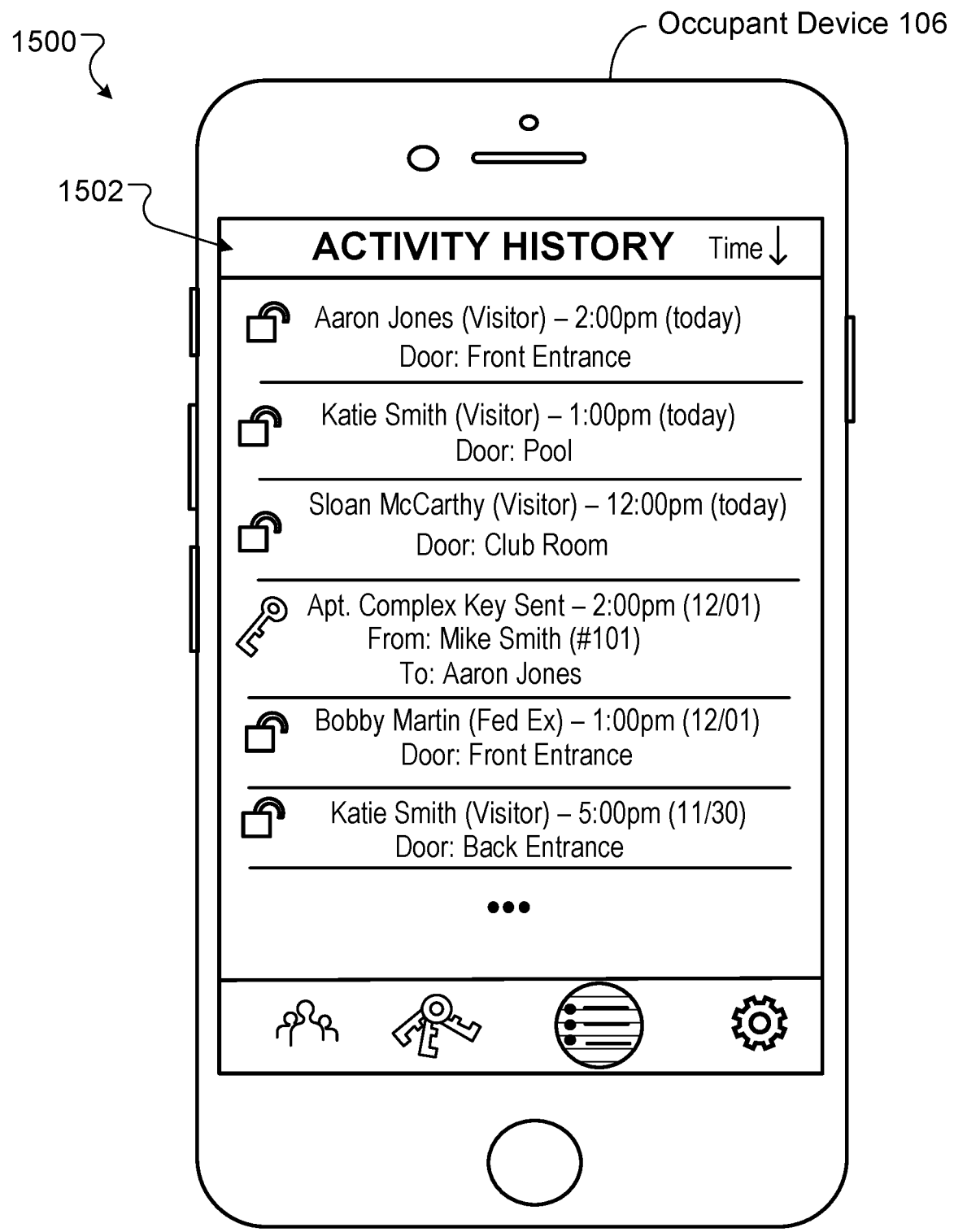

FIG. 15 is an example diagram 1500 of interface 1502 for a virtual intercom app, program, or website displayed on manager device 106.

FIG. 16 is an example diagram 1600 of interface 1602 for a virtual intercom app, program, or website displayed on manager device 106.

Figure 17A:
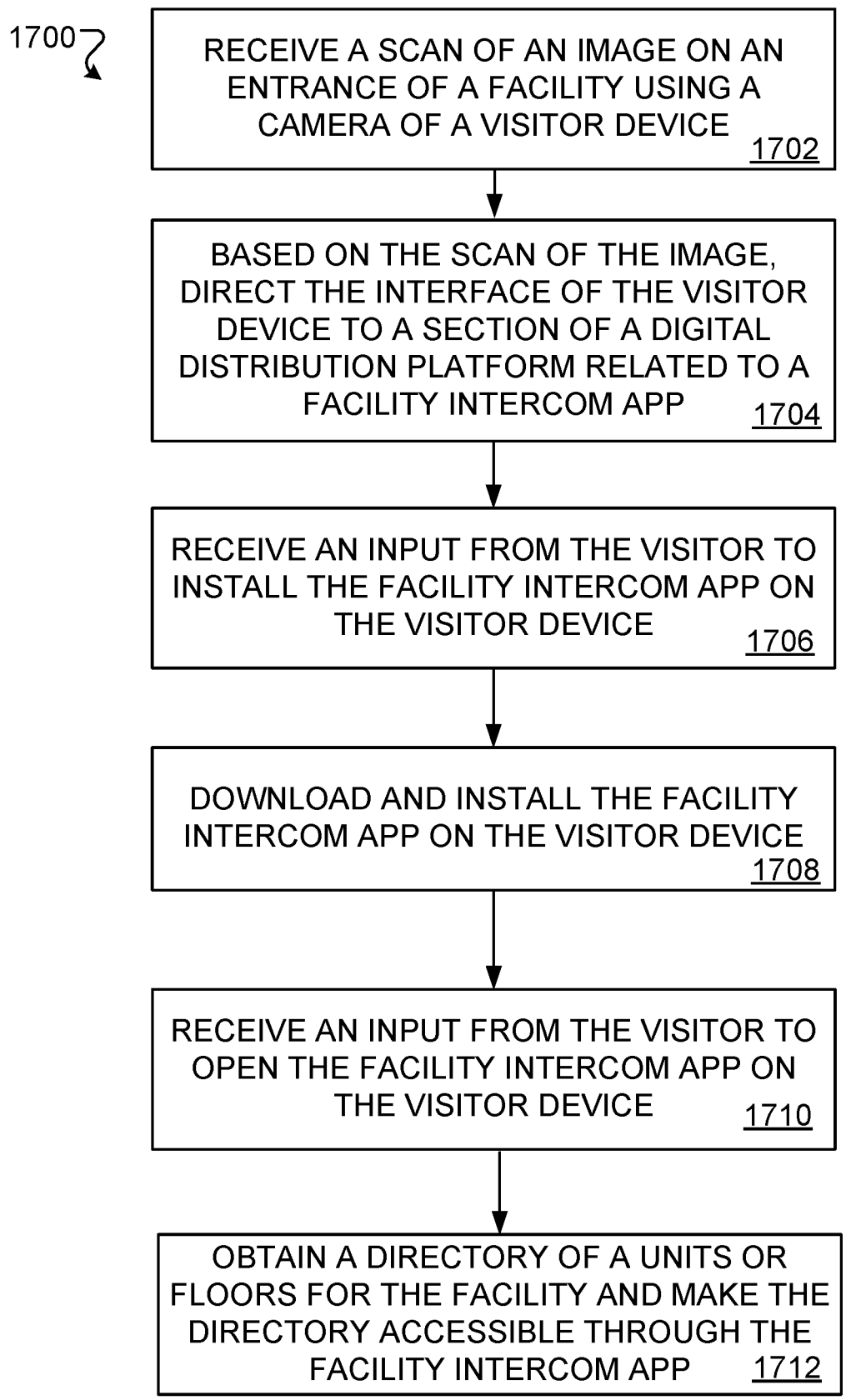
FIGS. 17A-17B illustrates an example process of requesting to communicate with an occupant through a visitor device 102.

FIG. 17A is an example process 1700 for a visitor requesting to communicate with an occupant of a facility. The process 1700 can be performed, at least in part, using the system 100 described herein.

In the process 1700, a computer system receives a scan of an image on an entrance of a facility using a camera of a visitor device (step 1702). This image may be a matrix barcode (e.g., matrix barcode 202 as shown in FIG. 2).

Based on the scan of the image, the computer system directs the interface of the visitor device to a section of a digital distribution platform related to a facility intercom app (step 1704). This digital distribution platform may be, for example, the App Store, Google Play Store, etc.

The computer system receives an input from the visitor to install the facility intercom app on the visitor device (step 1706).

The computer system downloads and installs the facility intercom app on the visitor device (step 1708).

The computer system receives an input from the visitor to open the facility intercom app on the visitor device (step 1710).

The computer system obtains a directory of a units or floors for the facility and makes the directory accessible through the facility intercom app (step 1712). For example, the computer system, which may be located on the visitor's device, makes the director accessible to the visitor through the facility intercom app.

Figure 17B:
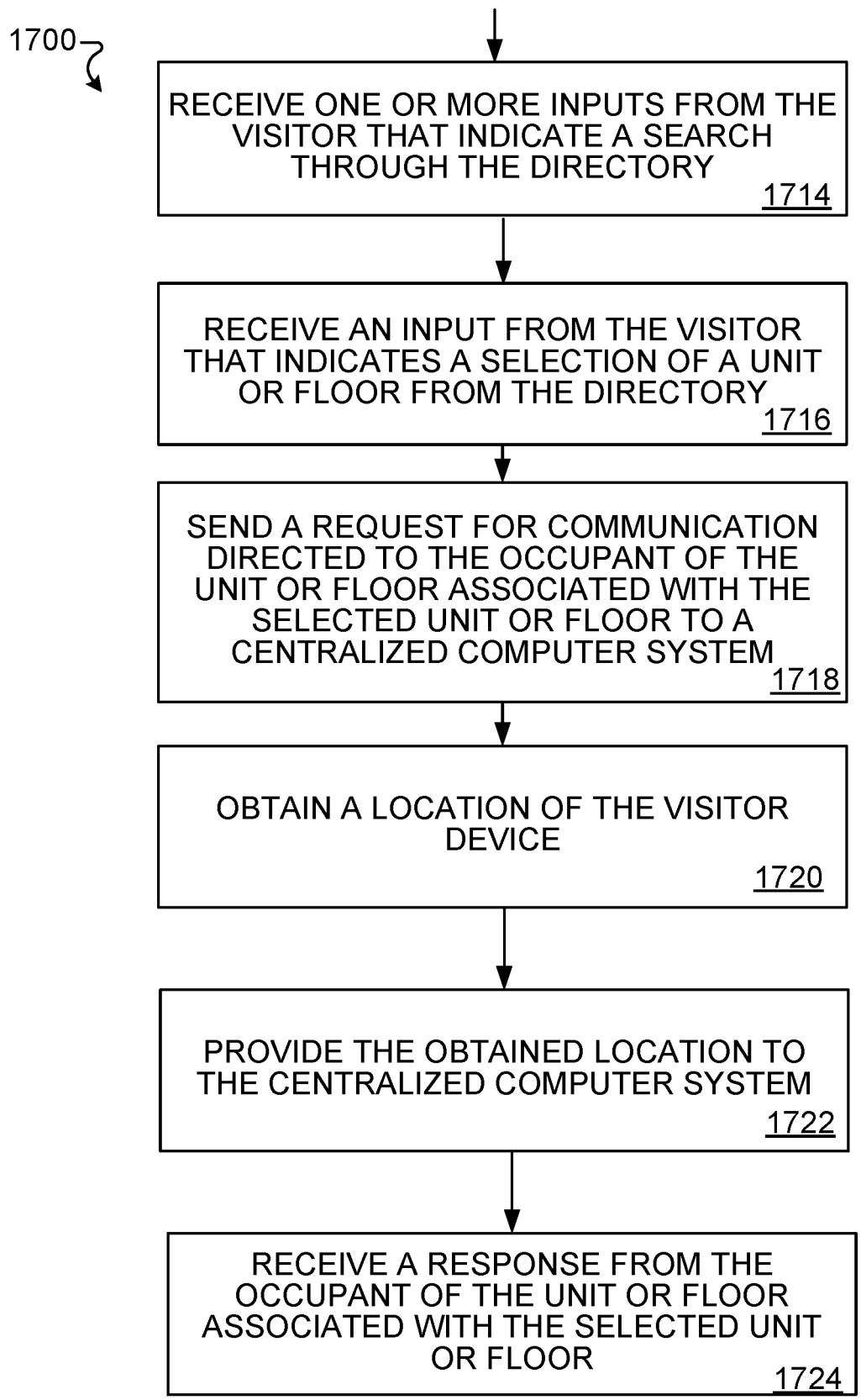

FIG. 17B depicts a continuation of example process 1700 for a visitor requesting to communicate with an occupant of a facility. The process 1700 can be performed, at least in part, using the system 100 described herein.

The computer system receives one or more inputs from the visitor that indicate a search through the directory (step 1714). The visitor may be able to search, for example, by a unit number of the occupant, a floor of the occupant, etc. In some implementations, the visitor may be able to search by a name of the occupant.

The computer system receives an input from the visitor that indicates a selection of a unit or floor from the directory (step 1716).

The computer system sends a request for communication directed to the occupant of the unit or floor associated with the selected unit or floor to a centralized computer system (step 1718).

The computer system obtains a location of the visitor device (step 1720). A location of the visitor device may be obtained through a GPS unit on the visitor device. In some implementations, a location is obtained through the visitor device's Wi-Fi or a Bluetooth connection.

The computer system provides the obtained location to the centralized computer system (step 1722). This computer system may provide this information through a network connection, such as a cellular network or Wi-Fi.

The computer system receives a response from the occupant of the unit or floor associated with the selected unit or floor (step 1724). The computer system may receive this response through a network connection, such as a cellular network or Wi-Fi.

Figure 18A:
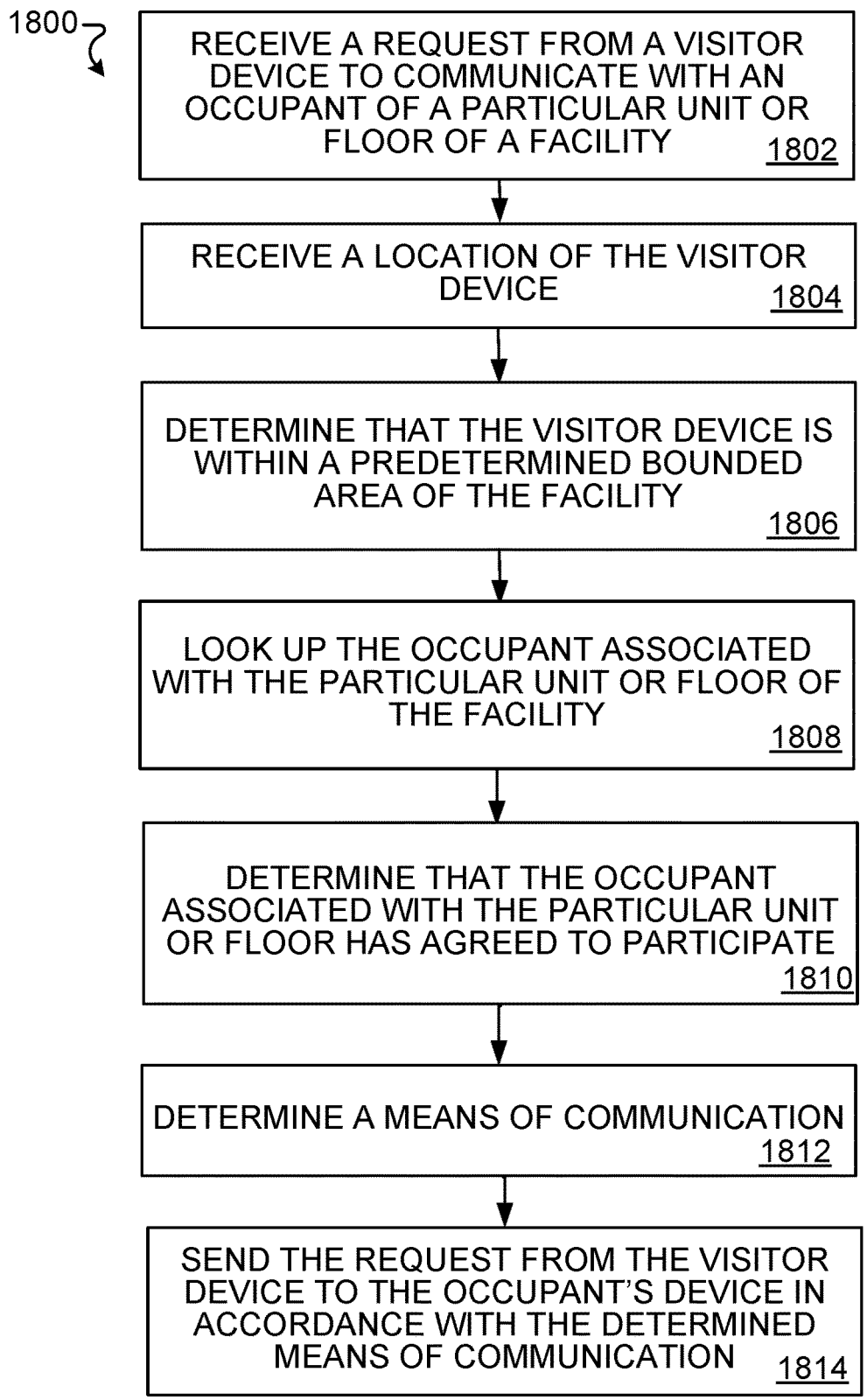
FIGS. 18A-18B illustrate an example process for facilitating communication between a visitor and an occupant.

FIG. 18A is an example process 1800 for facilitating communication between a visitor and an occupant. The process 1800 can be performed, at least in part, using the system 100 described herein.

In the process 1800, a computer system, such as a centralized computer system (e.g., centralized computer system 108 as shown in FIG. 1), receives a request from a visitor device to communicate with an occupant of a particular unit or floor of a facility (step 1802). This request may be request 132 (as shown in FIG. 1).

The computer system receive a location of the visitor device (step 1804). The computer system may receive a location of the visitor device from the visitor device itself (e.g., from a GPS unit on the visitor device). The computer system may receive a location of the visitor device based on the computer system or the visitor device determining a location of the visitor device based on the visitor device's Wi-Fi or a Bluetooth connection.

The computer system determines that the visitor device is within a predetermined bounded area of the facility (step 1806). The computer system may make this determination, for example, by comparing the location of the visitor device with a geofence (e.g., geofences 302, 306, and 312 as shown in FIG. 3).

The computer system looks up the occupant associated with the particular unit or floor of the facility (step 1808).

The computer system determines that the occupant associated with the particular unit or floor has agreed to participate (step 1810). As discussed above, an occupant may choose not to participate in the virtual intercom system (e.g., system 100 as shown in FIG. 1). In some implementations, a manager of the facility may require that the facility occupants participate in the virtual intercom system.

The computer system determines a means of communication (step 1812). A means of communication may include, for example, a voice call, text message, video call, etc.

The computer system sends the request from the visitor device to the occupant's device in accordance with the determined means of communication (step 1814). This request may be request 132 (as shown in FIG. 1).

Figure 18B:
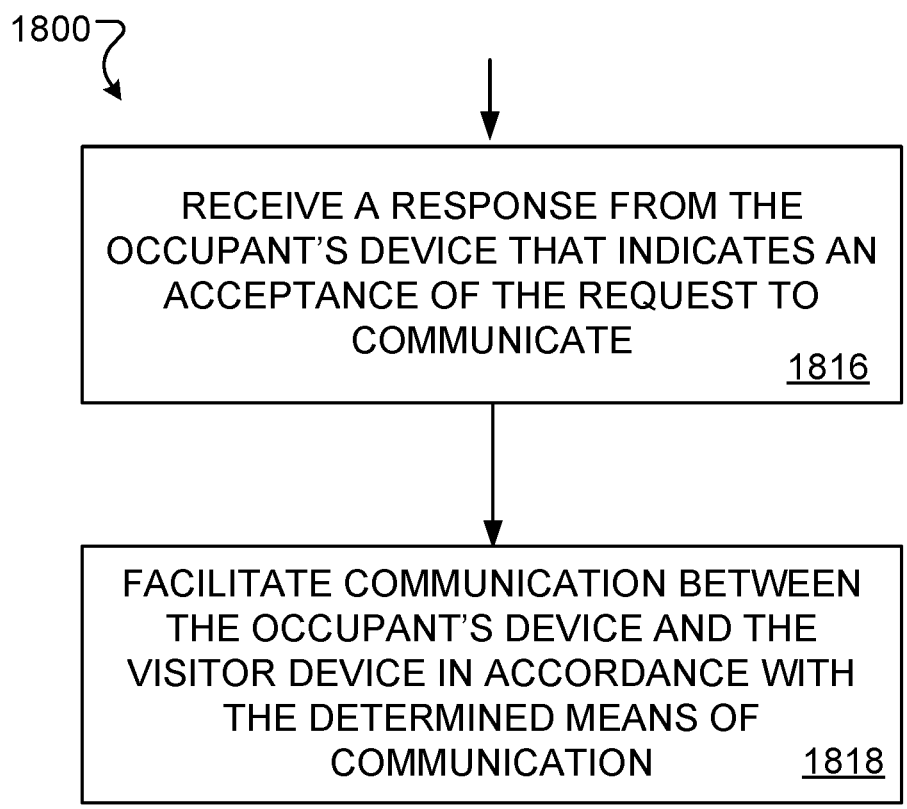

FIG. 18B depicts a continuation of example process 1800 for facilitating communication between a visitor and an occupant. The process 1800 can be performed, at least in part, using the system 100 described herein.

The computer system receives a response from the occupant's device that indicates an acceptance of the request to communicate (step 1816). This response may be response 134 (as shown in FIG. 1).

The computer system facilitates communication between the occupant's device and the visitor device in accordance with the determined means of communication (step 1818). A means of communication may include, for example, a voice call, text message, video call, etc.

Figure 19A:
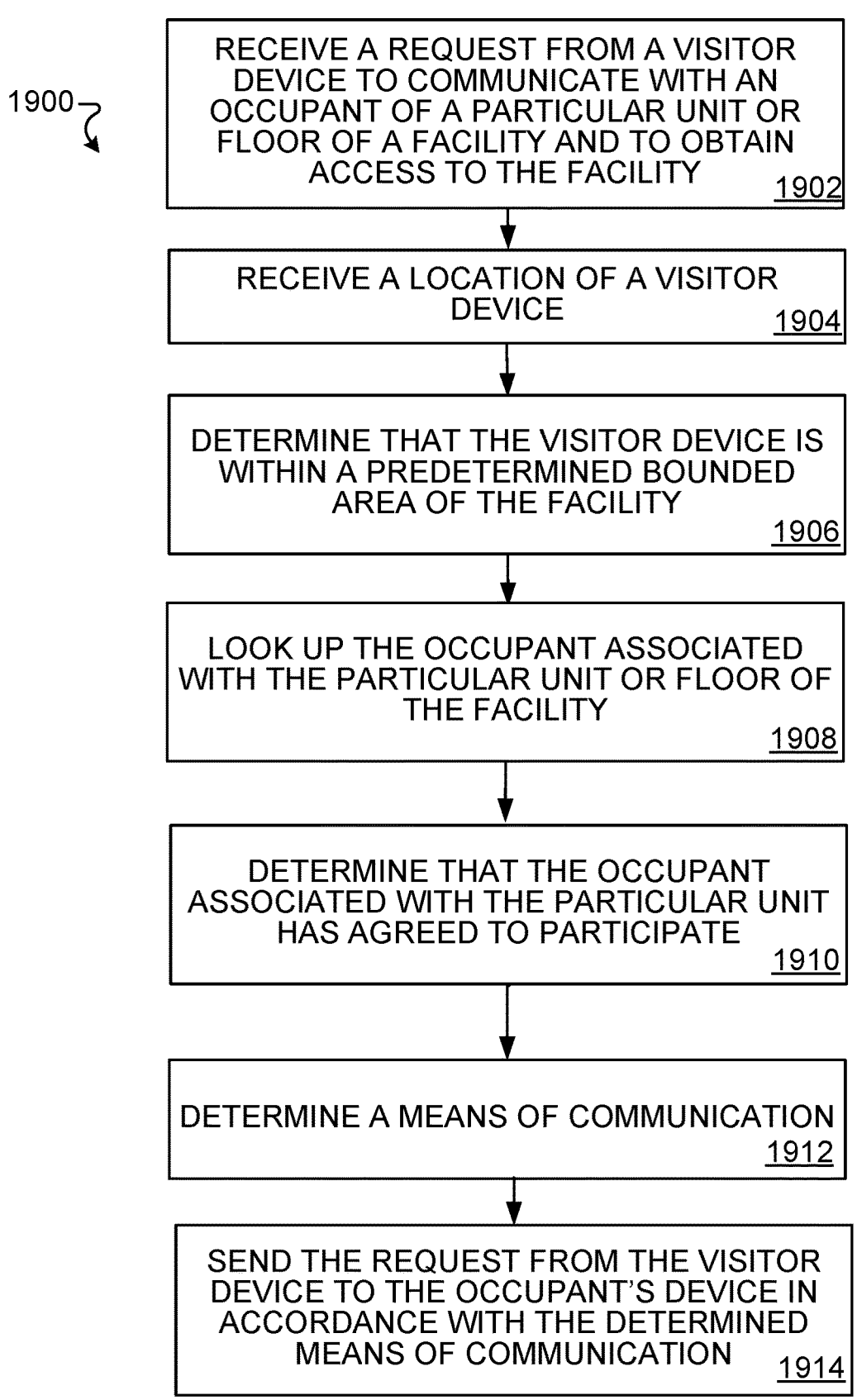
FIGS. 19A-19B illustrate example processes for facilitating communication between a visitor and an occupant, and granting an occupant access to a facility.

FIG. 19A is an example process 1900 for facilitating communication between a visitor and an occupant, and granting an occupant access to a facility. The process 1900 can be performed, at least in part, using the system 100 described herein.

In the process 1900, a computer system, such as a centralized computer system (e.g., centralized computer system 108 as shown in FIG. 1), receives a request from a visitor device to communicate with an occupant of a particular unit or floor of a facility and to obtain access to the facility (step 1902). This request may be request 132 (as shown in FIG. 1).

The computer system receive a location of the visitor device (step 1904). The computer system may receive a location of the visitor device from the visitor device itself (e.g., from a GPS unit on the visitor device). The computer system may receive a location of the visitor device based on the computer system or the visitor device determining a location of the visitor device based on the visitor device's Wi-Fi or a Bluetooth connection.

The computer system determines that the visitor device is within a predetermined bounded area of the facility (step 1906). The computer system may make this determination, for example, by comparing the location of the visitor device with a geofence (e.g., geofences 302, 306, and 312 as shown in FIG. 3).

The computer system looks up the occupant associated with the particular unit or floor of the facility (step 1908).

The computer system determines that the occupant associated with the particular unit or floor has agreed to participate (step 1910). As discussed above, an occupant may choose not to participate in the virtual intercom system (e.g., system 100 as shown in FIG. 1). In some implementations, a manager of the facility may require that the facility occupants participate in the virtual intercom system.

The computer system determines a means of communication (step 1912). A means of communication may include, for example, a voice call, text message, video call, etc.

The computer system sends the request from the visitor device to the occupant's device in accordance with the determined means of communication (step 1914). This request may be request 132 (as shown in FIG. 1).

Figure 19B:
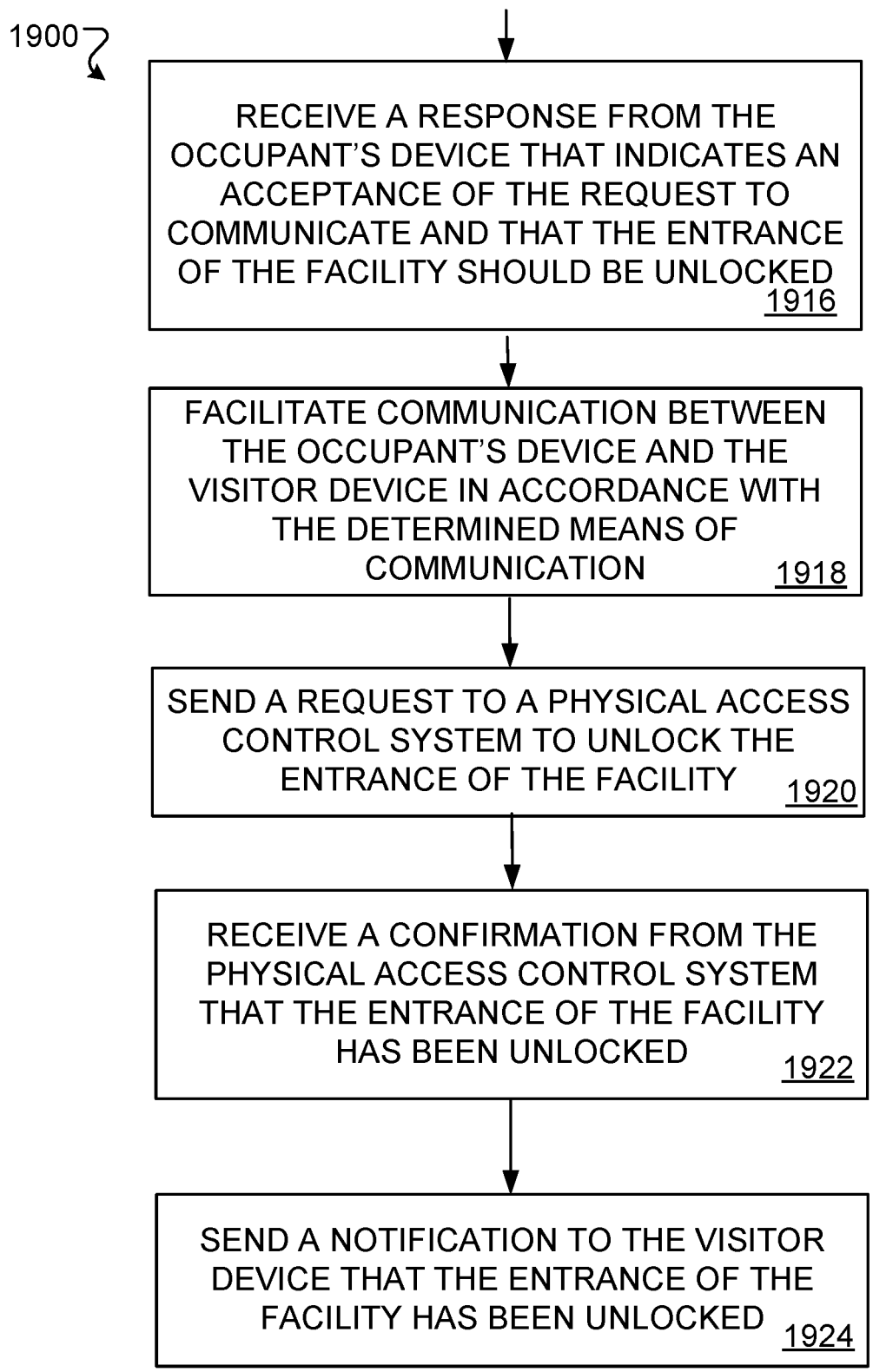

FIG. 19B depicts a continuation of example process 1900 for facilitating communication between a visitor and an occupant, and granting an occupant access to a facility. The process 1900 can be performed, at least in part, using the system 100 described herein.

The computer system receives a response from the occupant's device that indicates an acceptance of the request to communicate and that the entrance of the facility should be unlocked (step 1916). This response may be response 134 (as shown in FIG. 1).

The computer system facilitates communication between the occupant's device and the visitor device in accordance with the determined means of communication (step 1918). A means of communication may include, for example, a voice call, text message, video call, etc.

The computer system sends a request to a physical access control system to unlock the entrance of the facility (step 1920). The physical access control system may be PACS 118 (as shown in FIG. 1).

The computer system receives a confirmation from the physical access control system that the entrance of the facility has been unlocked (step 1922). The physical access control system may be PACS 118 (as shown in FIG. 1).

The computer system sends a notification to the visitor device that the entrance of the facility has been unlocked (step 1924). This notification may include, for example, a text message. This notification may include, for example, a graphical user interface element depicting a lock unlocked. This notification may be provided as part of response 134 (as shown in FIG. 1).

Figure 20A:
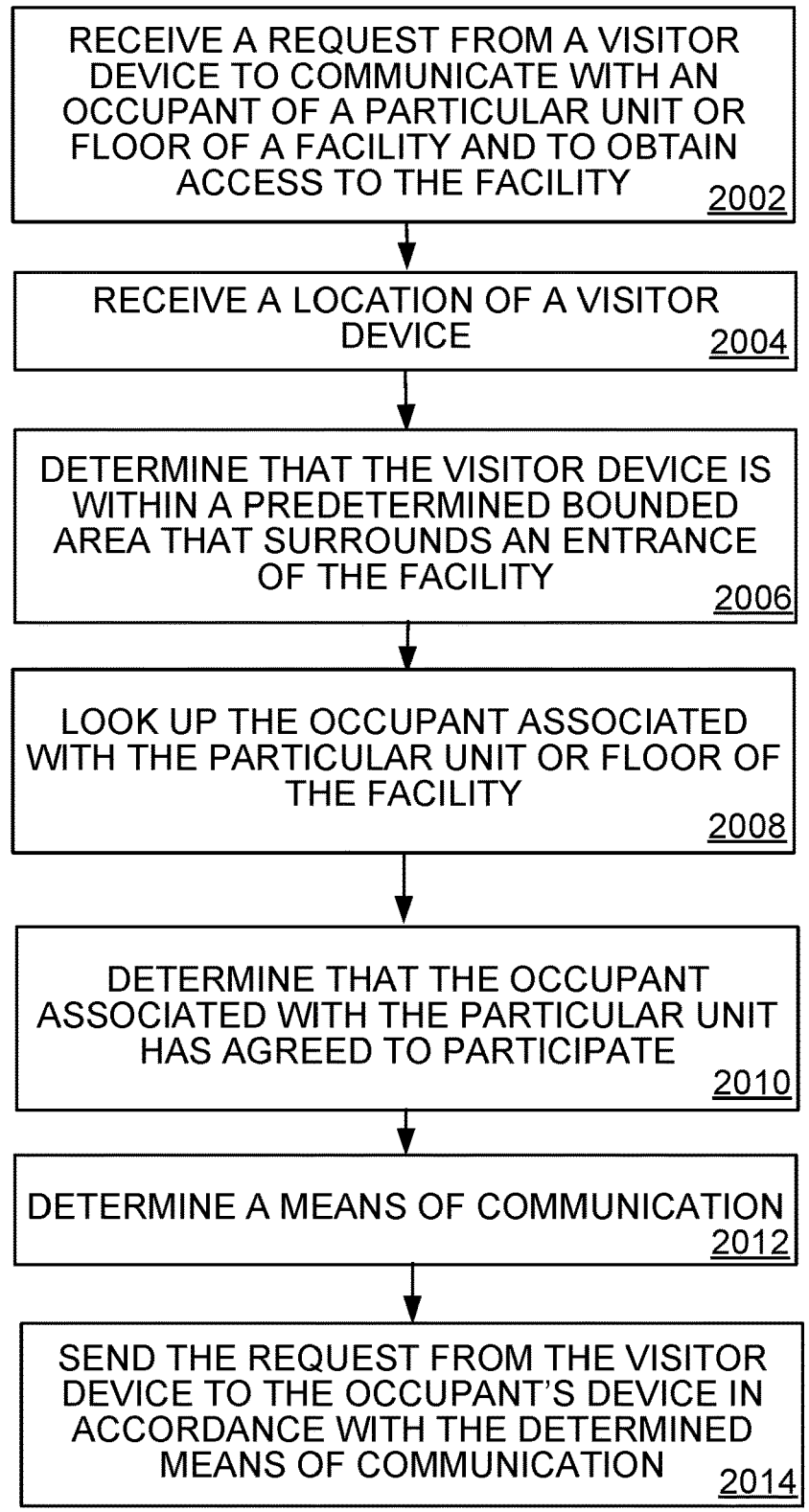
FIGS. 20A-20B illustrate example processes for facilitating communication between a visitor and an occupant, and granting an occupant access to a facility.

FIG. 20A is an example process 2000 for facilitating communication between a visitor and an occupant, and granting an occupant access to a facility. The process 2000 can be performed, at least in part, using the system 100 described herein.

In the process 2000, a computer system, such as a centralized computer system (e.g., centralized computer system 108 as shown in FIG. 1), receives a request from a visitor device to communicate with an occupant of a particular unit or floor of a facility and to obtain access to the facility (step 2002). This request may be request 132 (as shown in FIG. 1).

The computer system receive a location of the visitor device (step 2004). The computer system may receive a location of the visitor device from the visitor device itself (e.g., from a GPS unit on the visitor device). The computer system may receive a location of the visitor device based on the computer system or the visitor device determining a location of the visitor device based on the visitor device's Wi-Fi or a Bluetooth connection.

The computer system determines that the visitor device is within a predetermined bounded area that surrounds an entrance of the facility (step 1006). The computer system may make this determination, for example, by comparing the location of the visitor device with a geofence of an entrance of a facility (e.g., geofences 306 and 312 as shown in FIG. 3).

The computer system looks up the occupant associated with the particular unit or floor of the facility (step 2008).

The computer system determines that the occupant associated with the particular unit or floor has agreed to participate (step 2010). As discussed above, an occupant may choose not to participate in the virtual intercom system (e.g., system 100 as shown in FIG. 1). In some implementations, a manager of the facility may require that the facility occupants participate in the virtual intercom system.

The computer system determines a means of communication (step 2012). A means of communication may include, for example, a voice call, text message, video call, etc.

The computer system sends the request from the visitor device to the occupant's device in accordance with the determined means of communication (step 2014). This request may be request 132 (as shown in FIG. 1).

Figure 20B:
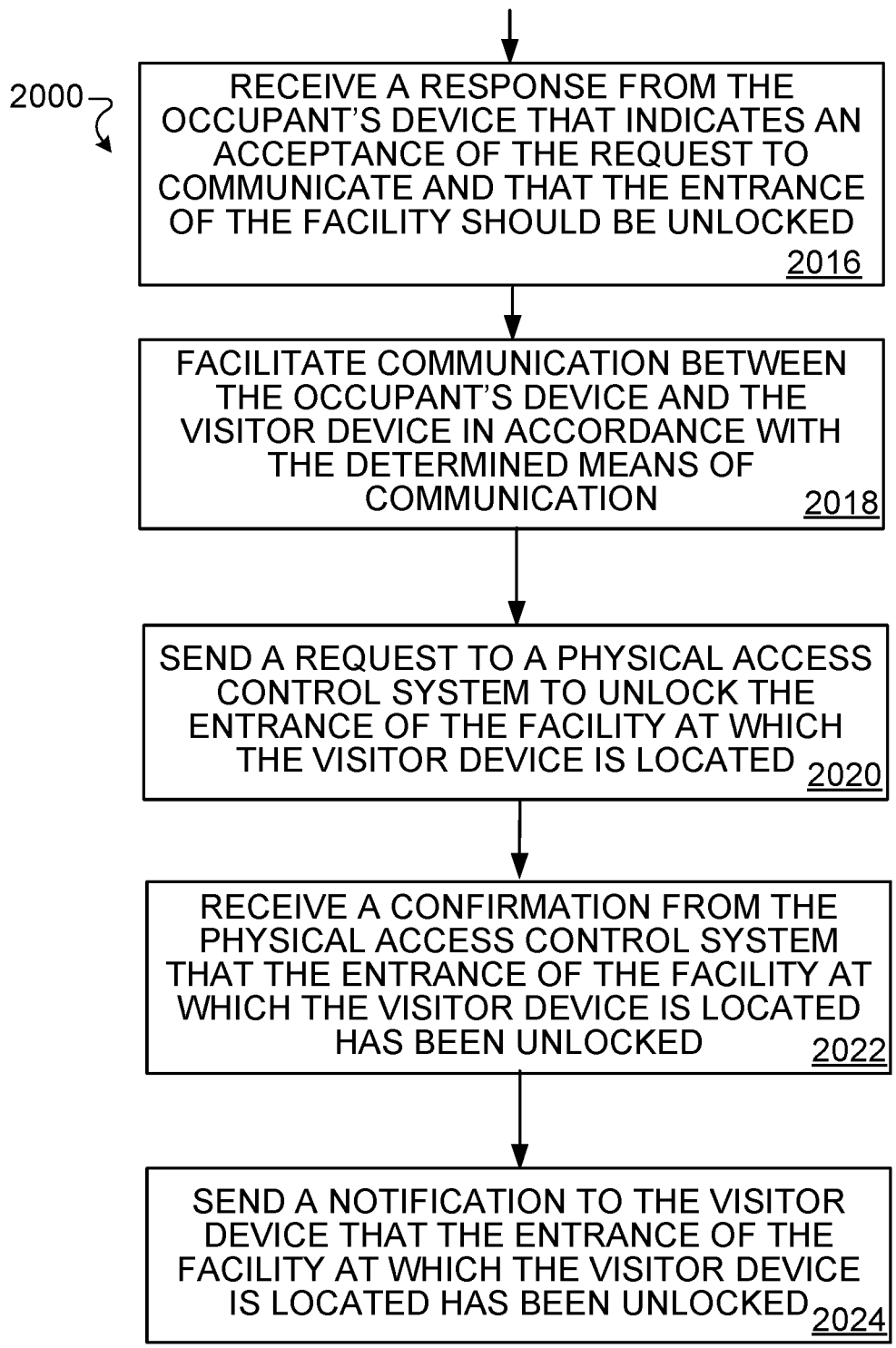

FIG. 20B depicts a continuation of example process 2000 for facilitating communication between a visitor and an occupant, and granting an occupant access to a facility. The process 2000 can be performed, at least in part, using the system 100 described herein.

The computer system receives a response from the occupant's device that indicates an acceptance of the request to communicate and that the entrance of the facility should be unlocked (step 2016). This response may be response 134 (as shown in FIG. 1).

The computer system facilitates communication between the occupant's device and the visitor device in accordance with the determined means of communication (step 2018). A means of communication may include, for example, a voice call, text message, video call, etc.

The computer system sends a request to a physical access control system to unlock the entrance of the facility at which the visitor device is located (step 1920). The physical access control system may be PACS 118 (as shown in FIG. 1). The entrance may be, for example, front entrance 206 (as shown in FIGS. 2-3). The entrance may be, for example, back entrance 310 (as shown in FIG. 3).

The computer system receives a confirmation from the physical access control system that the entrance of the facility at which the visitor device is located has been unlocked (step 2022). The physical access control system may be PACS 118 (as shown in FIG. 1).

The computer system sends a notification to the visitor device that the entrance of the facility at which the visitor device is located has been unlocked (step 2024). This notification may include, for example, a text message. This notification may include, for example, a graphical user interface element depicting a lock unlocked. This notification may be provided as part of response 134 (as shown in FIG. 1).

FIG. 21 is a flowchart of an example process 2100 for granting a visitor access to a building. In general, the process 2100 allows a resident of a property to grant a visitor access to the property through mobile devices. The process 2100 informs the resident that a visitor is present through a mobile device of the resident. The resident may grant the visitor access to the property by entering a code on the mobile device of the resident. The process 2100 transmits an instruction to unlock an electronic door lock which grants the visitor access. The process 2100 will be described as being performed by a computer system comprising one or more computers, for example, the system 100 as shown in FIG. 1. The one of more computers can include (i) a first client device that belongs to the visitor, (ii) a second client device that belongs to a resident of the property, (iii) a physical access control system that is configured to operate a lock of a door to the property, (iv) a manager device that is configured to receive, from an owner or manager of the property, data related to associating client devices of residents with portions or units of the property, (v) an internet connected door lock that is configured to receive, from over the internet or other communication channel, a command to unlock a door to the property, and/or (vi) a central computing system that is configured to communicate with client devices of residents and visitors, manager devices, physical access control systems, and connected door locks. The central computing system may be a cloud computing device or located locally at the property. In some implementations, there may be a central computing system for multiple properties, such as those in the same city.

The system receives, from a first client device, an identifier for a portion of a property and data identifying a location of the first client device (2110). In some implementations, the first client device is a mobile device such as a mobile phone, tablet, laptop computer, watch, or other similar device. The user may be located at door of the property and may be trying to visit a resident of a specific apartment number or deliver a package. However, the visitor may not have the phone number of the resident. The resident may be reluctant to distribute the resident's phone number. The visitor knows the unit number of the resident. When the visitor is located at the door of the building of the property, the visitor may send a message to the system indicating the unit number that the visitor wants to visit. The visitor may send the message through a messaging application. The visitor may send the unit number or another identifier to a particular phone number, email address, or another similar identifier for the property. In some implementations, the visitor may also send data identifying the visitor, such as a phone number, email address, company identifier, or other similar identifier.

In response to sending the message to the system indicating the unit number that the visitor wants to visit, the system may access the location of the first client device. The system may transmit a request, to the first client device, for the location of the first client device. The first client device may transmit location data based on GPS data, triangulation data, or another source of location information. In some implementations, the visitor may be using the first client device. The first client device may be communicating with the central computing system.

The system determines a second client device that corresponds to the identifier for the portion of the property (2120). The system may access data that relates one or more client devices to each identifier. This data may be managed by a manager of the property, and may map each unit number to one or more client devices. For example, system may receive the identifier for apartment 204. The identifier for apartment 204 may correspond to the phone number of a resident of apartment 204. Some identifiers for other apartments may corresponds to more than one phone number, email address, etc. in instances where more than one person lives at the apartment. In some implementations, the second client device is a mobile device such as a mobile phone, tablet, laptop computer, watch, or other similar device. The system may communicate with the first client device and the second device through a messaging application, SMS messaging, email, and/or any other similar application.

In some implementations, the system receives a request to associate a phone number or email address, with a particular unit of the property. This may occur when a person moves into the building. In this instance, the system may remove a current phone number or email address associated with the unit or identifier for the unit. Doing so will prevent the vacating resident from being contacted when a visitor arrives at the property. The system may then add the phone number or email address and associated it with the unit or identifier for the unit. The system may maintain a table or database that includes an identifier for each unit number and the current phone numbers or email addresses for each resident of each unit. In some implementations, the central computing system may be communicating with the manager device to identify the second client device. In some implementations, the central computing system may store a table that relates the second computing device with the identifier for the portion of the property. The table may be periodically updated using data from the manager device. The second computing device may belong to a resident of the portion of the property.

The system, based on the location of the first client device, determines that the first client device is located within a threshold distance of the property (2130). In some implementations, the system may compare the location of the first client device to the location of a building of the property. The system may determine that the visitor is at the property if the location of the first client device is without a threshold distance of a boundary of a building of the property. For example, the boundary may be twenty meters from the perimeter of the building. In some implementations, the system may determine that the first client device is located near a particular exterior entry door of the building of the property. For example, the system may compare the location of the first client device to the front door of the apartment building. The system may determine that the first client device is within a threshold distance, such as ten meters, of the front door of the apartment building. The system may later use this information to determine which door to unlock. In some implementations, the central computing device receives location data form the first client device. The visitor may instruct the first client device to provide the location data to the central computing device through the messaging application, or the central computing device may automatically request the location data from the first client device.

The system, based on determining that the first client device is located within the threshold distance of the property and based on determining that the second client device corresponds to the identifier for the portion of the property, transmits, to the second client device, data indicating that the first client device is located at the property (2140). For example, the system may transmit a message indicating that a representative from a delivery company is located at the front door to the apartment building and is attempting to make a delivery. The system may determine that the first client device is that of the delivery company because the system may compare the identifier for the first client device, such as a phone number, to a list of known identifiers for the delivery company. The delivery company may provide the system with an updated list at periodic intervals. In some implementations, the system may transmit the phone number of the first client device. The resident may decide to grant the visitor access to the property based on recognizing the phone number of the first client device or based on a conversation or message exchange between the first client device and the second client device. The system may facilitate communication between the first client device and the second client device as described above. In some implementations, the central computing device transmits, to the second client device of the resident, a notification that the visitor is located at the property.

The system receives, from the second client device, an instruction to grant a person associated with the first client device access to the property (2150). In some implementations, the system receives a code from the second client device. The code may corresponds to an instruction to unlock the door of the property. The system may compare the code to a stored unlock code. If there is a match, then the system proceeds to unlock the door. For example, the resident may send the message 1234 to the system. The system may compare the message 1234 to a stored message. The stored message may correspond to a command to unlock the door and may be 1234. In this instance, the system may authenticate the command do unlock the door because the message received from the second client device matches the stored message. If the message does not match the stored message, then the system may deny access to the visitor. In some implementations, the stored message is different for each resident and the client device of each resident. In some implementations, the central computing device receives, from the second client device of the resident, an instruction to grant the visitor access to the property.

The system transmits an instruction to unlock an electronic lock of a door of the property (2160). In some implementations, the electronic lock is configured to receive the instruction to unlock over the internet. For example, the electronic lock may have an antenna that connects to a cellular network or WiFi network. The system may transmit the instruction to unlock over the internet. Upon receipt of the instruction, the lock unlocks the door. In some implementations, the electronic lock is connected to a physical access control system. The physical access control system may receive the instruction to unlock and transmit a signal to the electronic lock to unlock. In this instance, the system may transmit data identifying the door for the physical access control system to unlock. In some implementations, the central computing device, may communicate with the physical access control system and/or the connected door lock. The central computing device may transmit an instruction to unlock a specific door of the property where the visitor is located. The central computing device may transmit an instruction to unlock a door to the property that is closest to the location of the first client device. The physical access control system or the connected door lock may then unlock the door to the property.

In some implementations, the building of the property may include more than one entry door. In this case, the system determines to which entry door the first client device is nearest. The system may transmit the instruction to unlock to the door to which the first client device is nearest. In some instances, the system may require that the first client device be within a threshold distance of the entry door before transmitting the unlock instruction.

In some implementations, the user of the second client device may move out of the property and another user may move into the same unit. The other user may use a third client device. In this instance, a manager of the property may update the database by disassociating the second client device from the identifier for the unit and associating the third client device with the identifier for the unit. With this update, the new resident will receive notifications on the third client device and from the system when a visitor is outside the property and requesting access to the unit. The old resident will no longer receive notifications on the second client device when a visitor is outside the property and requesting access to the unit.

In some instances, the user of the first client device may gain access to the property by following another person when the other person opens the door or by entering the property through another means. This may occur after the visitor requests access and before the resident grants access to the visitor. The system may request location data from the first client device periodically. This may be to ensure that the visitor is and continues to be near a door to the property before unlocking that door. Another benefit of requesting location data from the first client device periodically, is that the system can determine if the first client device is inside the building before the resident grants the visitor access. If this happens, the system may generate an alert and send the alert to the resident and/or send the alert to a manager of the building. The alert may identify the location of the first client device and any other information identifying the visitor.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

What is claimed is:

1. A computer-implemented method comprising:
    receiving, by one or more computing devices and from a first client device, an identifier for a portion of a property and data identifying a location of the first client device;
    determining, by the one or more computing devices, a second client device that corresponds to the identifier for the portion of the property;
    based on the location of the first client device, determining, by the one or more computing devices, that the first client device is located within a threshold distance of the property;
    based on determining that the first client device is located within the threshold distance of the property and based on determining that the second client device corresponds to the identifier for the portion of the property, transmitting, by the one or more computing device and to the second client device, data indicating that the first client device is located at the property;
    receiving, by the one or more computing devices and from the second client device, an instruction to grant a person associated with the first client device access to the property; and
    transmitting, by the one or more computing devices, an instruction to unlock an electronic lock of a door of the property.

2. The method of claim 1, wherein the first client device and the second client devices are mobile computing devices that are detached from the property.

3. The method of claim 1, wherein:
    determining that the first client device is located within the threshold distance of the property comprises determining that the first client device is located within a threshold distance of the door of the property,
    transmitting the data indicating that the first client device is located at the property comprises transmitting data indicating that the first client device is located within the threshold distance of the door of the property, and
    receiving the instruction to grant the person associated with the first client device access to the property comprises receiving an instruction to grant the person associated with the first client device access to the property through the door.

4. The method of claim 1, comprising:
    receiving, by the one or more computing devices, an instruction to assign the second client device to the identifier for the portion of the property; and
    assigning, by the one or more computing devices, the identifier for the portion of the property to the second client device.

5. The method of claim 1, comprising:
    receiving, by the one or more computing devices, an instruction to disassociate the second client device from the identifier for the portion of the property and an instruction to assign a third client device to the identifier for the portion of the property;
    assigning, by the one or more computing devices, the identifier for the portion of the property to the third client device;
    disassociating, by the one or more computing devices, the second client device from the identifier for the portion of the property;
    receiving, by the one or more computing devices and from the first client device, the identifier for the portion of the property and data identifying an additional location of the first client device;
    determining, by the one or more computing device, that the third client device corresponds to the identifier for the portion of the property;
    based on the additional location of the first client device, determining, by the one or more computing devices, that the first client device is located within the threshold distance of the property;
    based on determining that the first client device is located within the threshold distance of the property and based on determining that the third client device corresponds to the identifier for the portion of the property, transmitting, by the one or more computing device and to the third client device, additional data indicating that the first client device is located at the property;
    receiving, by the one or more computing devices and from the second client device, an additional instruction to grant the person associated with the first client device access to the property; and
    transmitting, by the one or more computing devices, an additional instruction to unlock the electronic lock of the door of the property.

6. The method of claim 1, comprising:
    based on the location of the first client device, determining, by the one or more computing devices, that the first client device is within an additional threshold distance of the door of the property,
    wherein transmitting the instruction to unlock the electronic lock of the door of the property is based on determining that the first client device is within the additional threshold distance of the door of the property.

7. The method of claim 1, comprising:
receiving, by the one or more computing devices and from the first client device, the identifier for the portion of the property and data identifying an additional location of the first client device;
based on the additional location of the first client device, determining, by the one or more computing devices, that the first client device is located within the threshold distance of the property;
based on determining that the first client device is located within the threshold distance of the property and based on determining that the second client device corresponds to the identifier for the portion of the property, transmitting, by the one or more computing device and to the second client device, additional data indicating that the first client device is located at the property;
before receiving an additional instruction to grant the person associated with the first client device access to the property, determining, by the one or more computing devices, that the first client device is inside a building of the property; and
based on determining that the first client device is inside the building of the property, generating, by the one or more computing devices, an alert indicating that the first client device is inside the building of the property without receiving the additional instruction to grant the person associated with the first client device access to the property.

8. The method of claim 1, wherein:
the property includes a building that includes the door, and
the first client device is located outside the building.

9. The method of claim 1, wherein the electronic door lock is configured to receive the instruction to unlock wirelessly over the internet.

10. The method of claim 1, wherein:
transmitting the instruction to unlock the electronic lock of the door of the property comprises transmitting, to a physical access control system, an instruction to unlock the electronic lock of the door of the property,
the physical access control system transmits, to the electronic lock, a signal that unlocks the electronic lock.

11. The method of claim 1, wherein receiving the instruction to grant the person associated with the first client device access to the property comprises:
receiving, from the second client device, a code;
determining that the code matches a stored code; and
based on determining that the code matches the stored code, authenticating the instruction to grant the person associated with the first client device access to the property.

12. The method of claim 1, wherein the first client device and the second client device communicate with the one or more computing devices through a messaging application.

13. The method of claim 1, wherein the portion of the property is a unit in a building of the property.

14. A system comprising:
one or more computers; and
one or more storage devices storing instructions that are operable, when executed by the one or more computers, to cause the one or more computers to perform operations comprising
receiving, by one or more computing devices and from a first client device, an identifier for a portion of a property and data identifying a location of the first client device;
determining, by the one or more computing devices, a second client device that corresponds to the identifier for the portion of the property;
based on the location of the first client device, determining, by the one or more computing devices, that the first client device is located within a threshold distance of the property;
based on determining that the first client device is located within the threshold distance of the property and based on determining that the second client device corresponds to the identifier for the portion of the property, transmitting, by the one or more computing device and to the second client device, data indicating that the first client device is located at the property;
receiving, by the one or more computing devices and from the second client device, an instruction to grant a person associated with the first client device access to the property; and
transmitting, by the one or more computing devices, an instruction to unlock an electronic lock of a door of the property.

15. The system of claim 14, wherein the first client device and the second client devices are mobile computing devices that are detached from the property.

16. The system of claim 14, wherein:
determining that the first client device is located within the threshold distance of the property comprises determining that the first client device is located within a threshold distance of the door of the property,
transmitting the data indicating that the first client device is located at the property comprises transmitting data indicating that the first client device is located within the threshold distance of the door of the property, and
receiving the instruction to grant the person associated with the first client device access to the property comprises receiving an instruction to grant the person associated with the first client device access to the property through the door.

17. The system of claim 14, wherein the operations comprise:
receiving, by the one or more computing devices, an instruction to assign the second client device to the identifier for the portion of the property; and
assigning, by the one or more computing devices, the identifier for the portion of the property to the second client device.

18. The system of claim 14, wherein the operations comprise:
receiving, by the one or more computing devices, an instruction to disassociate the second client device from the identifier for the portion of the property and an instruction to assign a third client device to the identifier for the portion of the property;
assigning, by the one or more computing devices, the identifier for the portion of the property to the third client device;
disassociating, by the one or more computing devices, the second client device from the identifier for the portion of the property;
receiving, by the one or more computing devices and from the first client device, the identifier for the portion of the property and data identifying an additional location of the first client device;
determining, by the one or more computing device, that the third client device corresponds to the identifier for the portion of the property;

based on the additional location of the first client device, determining, by the one or more computing devices, that the first client device is located within the threshold distance of the property;

based on determining that the first client device is located within the threshold distance of the property and based on determining that the third client device corresponds to the identifier for the portion of the property, transmitting, by the one or more computing device and to the third client device, additional data indicating that the first client device is located at the property;

receiving, by the one or more computing devices and from the second client device, an additional instruction to grant the person associated with the first client device access to the property; and transmitting, by the one or more computing devices, an additional instruction to unlock the electronic lock of the door of the property.

19. The system of claim 14, wherein the operations comprise:

based on the location of the first client device, determining, by the one or more computing devices, that the first client device is within an additional threshold distance of the door of the property, wherein transmitting the instruction to unlock the electronic lock of the door of the property is based on determining that the first client device is within the additional threshold distance of the door of the property.

20. A non-transitory computer-readable medium storing software comprising instructions executable by one or more computers which, upon such execution, cause the one or more computers to perform operations comprising:

receiving, by one or more computing devices and from a first client device, an identifier for a portion of a property and data identifying a location of the first client device;

determining, by the one or more computing devices, a second client device that corresponds to the identifier for the portion of the property;

based on the location of the first client device, determining, by the one or more computing devices, that the first client device is located within a threshold distance of the property;

based on determining that the first client device is located within the threshold distance of the property and based on determining that the second client device corresponds to the identifier for the portion of the property, transmitting, by the one or more computing device and to the second client device, data indicating that the first client device is located at the property;

receiving, by the one or more computing devices and from the second client device, an instruction to grant a person associated with the first client device access to the property; and transmitting, by the one or more computing devices, an instruction to unlock an electronic lock of a door of the property.

\* \* \* \* \*